US010362762B2

(12) United States Patent
Fitch

(10) Patent No.: US 10,362,762 B2
(45) Date of Patent: Jul. 30, 2019

(54) PET WASTE COLLECTION AND DISPOSAL APPARATUS

(71) Applicant: Sarah Fitch, Poway, CA (US)

(72) Inventor: Sarah Fitch, Poway, CA (US)

( * ) Notice: Subject to any disclaimer, the term of this patent is extended or adjusted under 35 U.S.C. 154(b) by 427 days.

(21) Appl. No.: 15/165,398

(22) Filed: May 26, 2016

(65) Prior Publication Data

US 2017/0339911 A1   Nov. 30, 2017

(51) Int. Cl.
*A01K 1/01* (2006.01)

(52) U.S. Cl.
CPC ............ *A01K 1/011* (2013.01); *A01K 1/0125* (2013.01)

(58) Field of Classification Search
CPC ........ A01K 1/001; A01K 1/0125; A01K 1/01; A01K 1/0107; A01K 1/0117
See application file for complete search history.

(56) References Cited

U.S. PATENT DOCUMENTS

| | | | |
|---|---|---|---|
| 3,964,437 A | 6/1976 | Brown | |
| 4,549,502 A * | 10/1985 | Namdari | A01K 13/001 119/664 |
| 4,729,342 A | 3/1988 | Loctin | |
| 4,987,861 A * | 1/1991 | Lemire | A01K 13/001 119/667 |
| 5,494,001 A | 2/1996 | Leibowitz et al. | |
| 5,791,288 A | 8/1998 | Ehrler | |
| 6,561,131 B1 | 5/2003 | Schwartz | |
| 6,938,579 B2 | 9/2005 | Sharpe | |
| 8,544,418 B2 | 10/2013 | Jiang et al. | |
| 9,074,376 B2 | 7/2015 | Dustin | |
| 2003/0196608 A1* | 10/2003 | Lee | A01K 13/001 119/651 |
| 2005/0028744 A1 | 2/2005 | Gantt | |
| 2006/0249090 A1 | 11/2006 | Ahad | |
| 2008/0245309 A1 | 10/2008 | Markley | |
| 2010/0122662 A1 | 5/2010 | Kennington | |
| 2014/0174369 A1* | 6/2014 | Bernal | A01K 1/0107 119/163 |

\* cited by examiner

*Primary Examiner* — Jessica B Wong
(74) *Attorney, Agent, or Firm* — Keeley DeAngelo LLP; W Scott Keeley

(57) ABSTRACT

An automated pet waste collection and disposal apparatus is presented herein. The apparatus includes automated closing door, pivotal at or near the bottom, such that the door can be disposed in an open, extended position and closed, substantially vertically oriented position. When the door is open and/or extended, the top portion thereof defines a main collection surface designed to act as a surface upon which a pet may leave its waste. A movable nozzle assembly is disposed on the interior of the apparatus and is used to spray water or fluid upon the main collection surface for cleaning. The nozzle assembly moves in a manner to spray the entire or a substantial portion of the main collection surface of the door.

4 Claims, 30 Drawing Sheets

PET WASTE COLLECTION AND DISPOSAL APPARATUS

FIELD OF THE INVENTION

The present invention is directed to a pet waste collection and disposal apparatus, and in some embodiments, the automated and/or manual operation of a pet waste collection and disposal apparatus.

BACKGROUND OF THE INVENTION

The proper and sanitary disposal of pet waste and excrement is often a challenge for many pet owners, and particularly those pet owners who either live in an apartment or town home, or otherwise do not have ready access to open land, such as a back yard or park. Even if the pet owner does have access to open land where the pet can leave its waste, oftentimes, it may be difficult for the pet owner to consistently be at home in order to effectively and periodically let the pet outside, for example, during long work days.

There is thus a need in the art for a pet waste collection and disposal apparatus that can collect the pet waste and dispose of the pet waste, for example, through the sewage, septic or other plumbing already integrated within the home, building or other structure. It would be advantageous if the proposed apparatus could automatically detect the presence of the pet waste and automatically activate a cleaning cycle, thereby collecting the waste, disposing the waste, and preparing the apparatus for its next use, without the intervention or active participation of the pet owner.

This would not only provide a sanitary and efficient manner in which the pet waste can be collected, but it also provides the pet owner flexibility and options in terms of managing the collection of pet waste, especially for those pet owners who live in apartments, town homes or otherwise do not have ready access to open land.

SUMMARY OF THE INVENTION

The present invention is directed to a pet waste collection and disposal apparatus, which, in certain embodiments may either be manually operated or fully or partially automated. For instance, some embodiments include an automated closing door, pivotal at or near the bottom, such that the door can be disposed in an open, extended position and closed, substantially vertically oriented position.

When the door is open and/or extended, the top portion includes or defines a main collection surface designed to act as a surface upon which a pet may leave its waste (e.g., urine or feces). The main collection surface may be or otherwise include a removable pad with artificial or synthetic grass for simulating natural grass, although other surfaces are contemplated within the full spirit and scope of the present invention.

A movable nozzle assembly is disposed on the interior of the apparatus and is used to spray either clean/fresh water (e.g., from the water input line of the house, building or structure) or recycled/re-circulated water/fluid from within the apparatus, as described herein. The nozzle assembly of certain embodiments will move within the body or housing, for example, in a general vertical or up and down motion, in horizontal side-to-side motion, or other like movements, while the door is closed in order to spray the entire or a substantial portion of the main collection surface of the door. Through gravity, the water, fluid, and pet waste will flow down the main collection surface, over a bypass collection surface and into a basin or receptacle, where it is either collected and recirculated or disposed of through the interconnected sewage, septic or other output line.

These and other objects, features and advantages of the present invention will become more apparent when the drawings as well as the detailed description are taken into consideration.

BRIEF DESCRIPTION OF THE DRAWINGS

FIG. 8A is a front perspective view of the pet waste collection and disposal apparatus of at least one embodiment disclosed herein showing a flow of gas there through.

Like reference numerals refer to like parts throughout the several views of the drawings provided herein.

DETAILED DESCRIPTION OF THE INVENTION

Figure 1A:
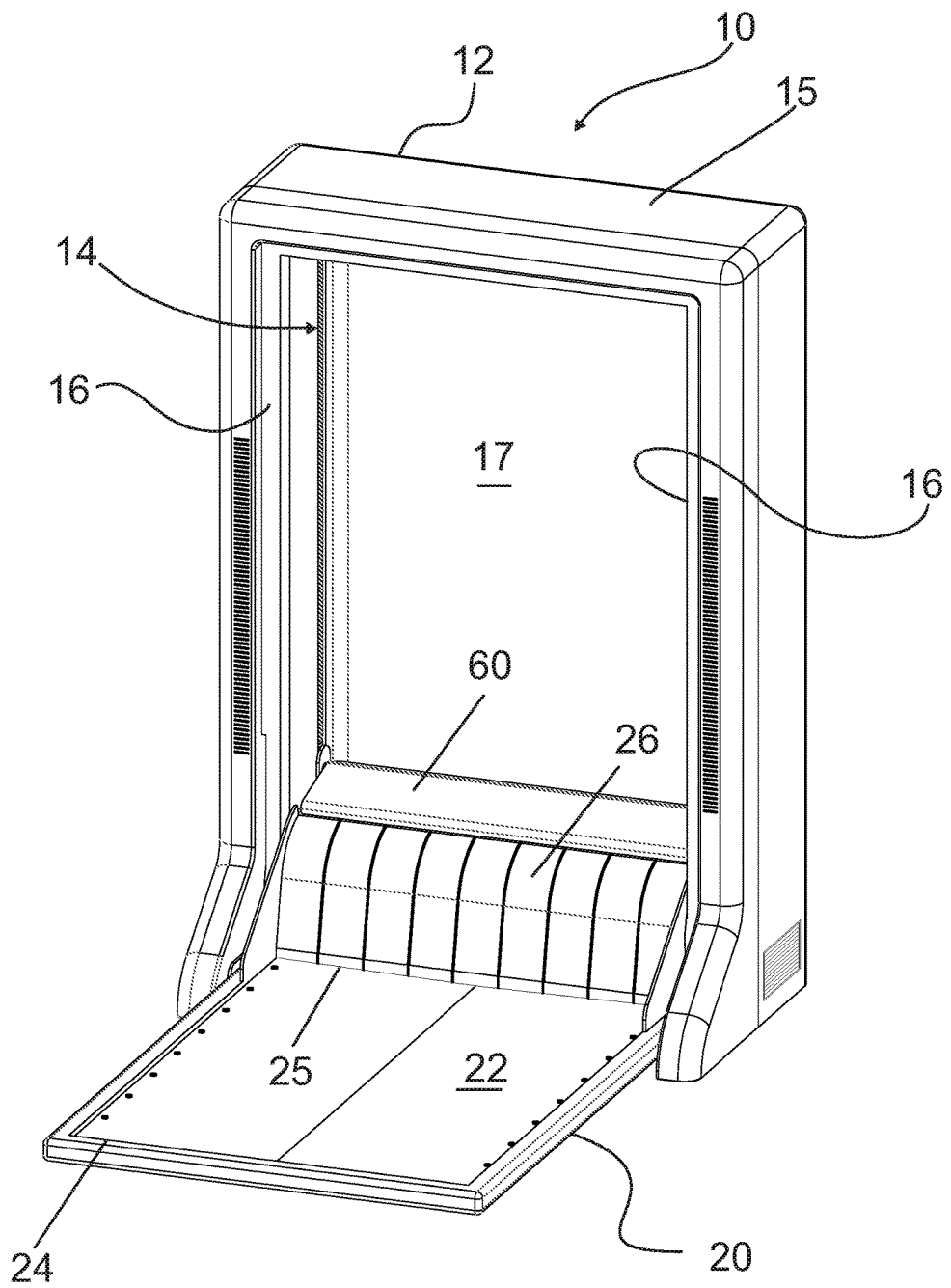
FIG. 1A is a front perspective view of the pet waste collection and disposal apparatus as disclosed in accordance with at least one embodiment herein, with the door disposed in an open, outwardly extended position.

As shown in the accompanying drawings, and with particular reference to FIGS. 1A though 3, the present invention is directed to a pet waste collection and disposal apparatus, generally referenced as 10. In particular, the pet waste collection and disposal apparatus 10 of the various embodiments of the present invention may be installed indoors or outdoors, and as discussed herein, may be interconnected to a water source (e.g., a water supply line provided as part of the plumbing integrated with the home or building) as well as a drain, sewage, or septic tank output provided as part of the waste disposal line integrated with the home or building. As will become apparent from the description provided herein, the apparatus 10 of certain embodiments may be structured to function in an automated or at least partially automated manner such that detection of pet waste or motion may trigger a cleaning and/or flushing cycle. In some embodiments, detection of motion, alone, could be used to trigger a cleaning or flushing cycle. For instance, in at least one embodiment, upon detecting motion on or near a pad or main collection surface, a cleaning cycle may be initiated, for example, after a certain amount of time or when one or more motion sensors cease detecting motion.

Figure 1B:
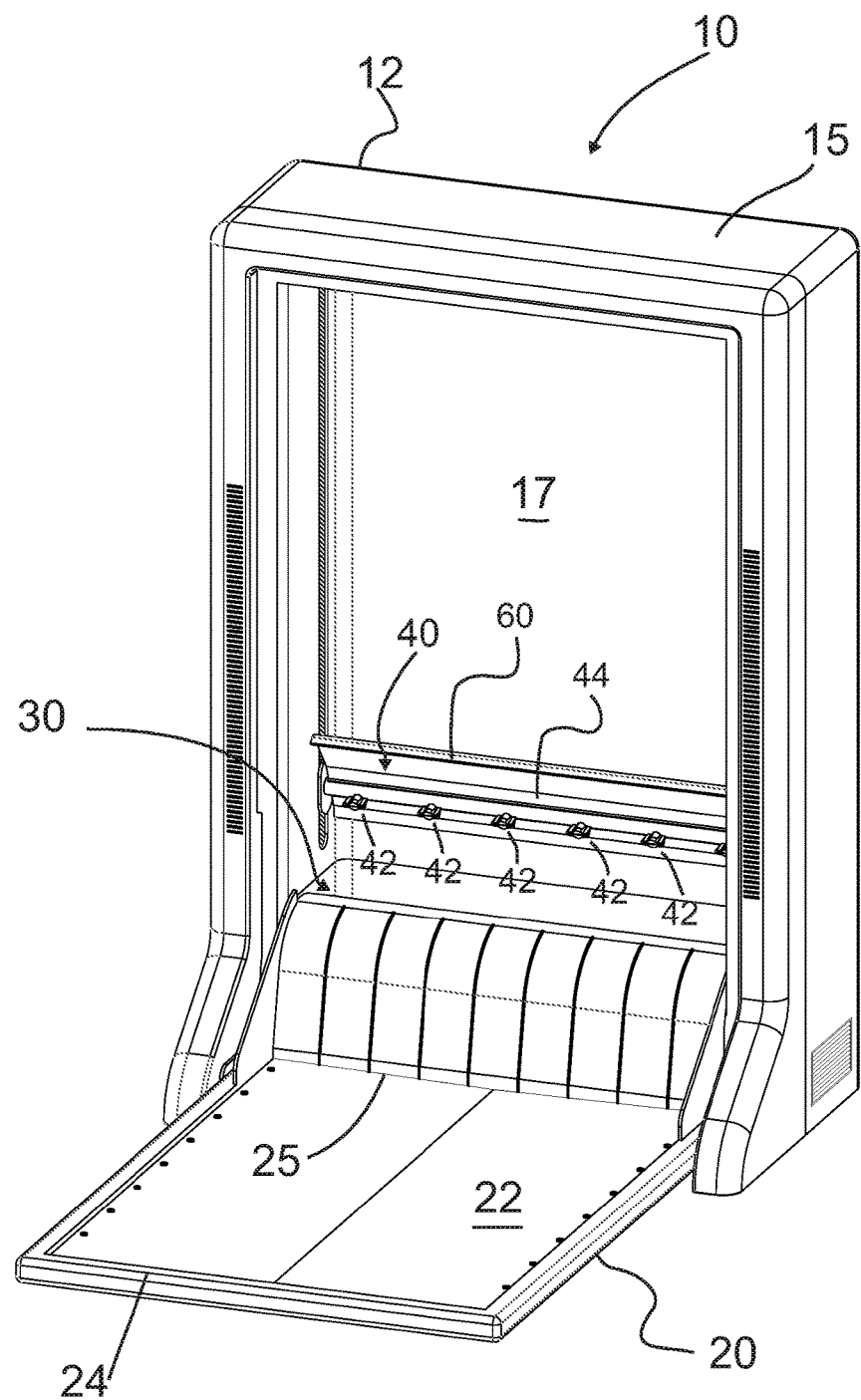
FIG. 1B is another front perspective view of the pet waste collection and disposal apparatus as disclosed in accordance with at least one embodiment herein, with the door disposed in an open, outwardly extended position.
Figure 1C:
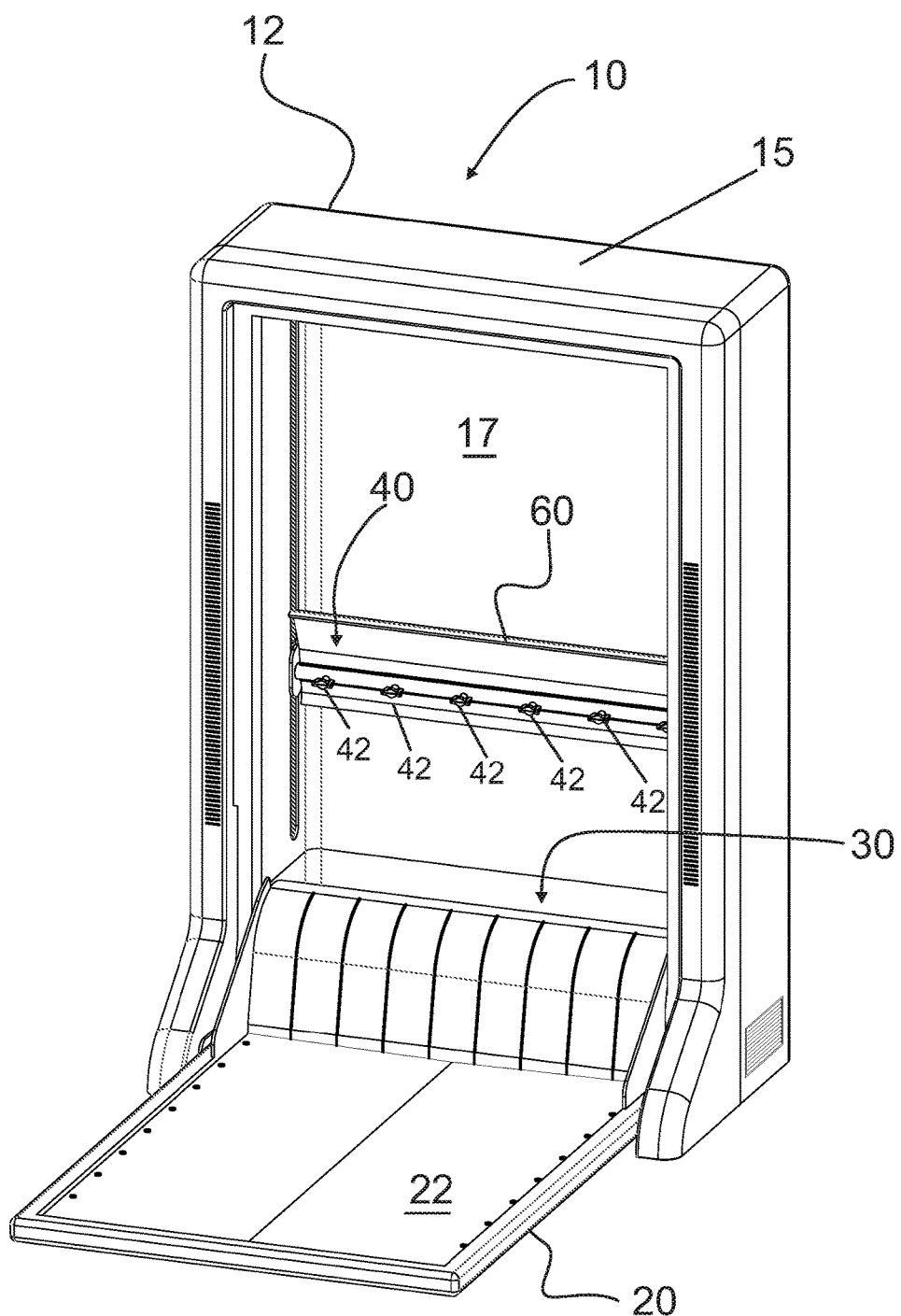
FIG. 1C is yet another front perspective view of the pet waste collection and disposal apparatus as disclosed in accordance with at least one embodiment herein, with the door disposed in an open, outwardly extended position.

Specifically, with reference to FIGS. 1A, 1B and 1C, the pet waste collection and disposal apparatus 10 of at least one embodiment includes a housing or body 12 defining an interior portion 14. In the embodiment shown, the housing or body 12 includes a top 15, two side walls 16, a rear wall 17 and an open front. A door 20 is movably interconnected to the body 12 in a manner to at least partially open and close the interior portion 14 thereof. Particularly, as shown in FIGS. 1A through 3, the door 20 of at least one embodiment is positionable in a vertically pivotal manner relative to the housing or body 12 in order to position the door 20 between the open position (FIG. 1A through 1C) and closed position (FIG. 3). Other embodiments may include a door pivotal or movable in different directions or manners than that illustrated in the exemplary embodiments, for instance, horizontally.

Figure 2A:
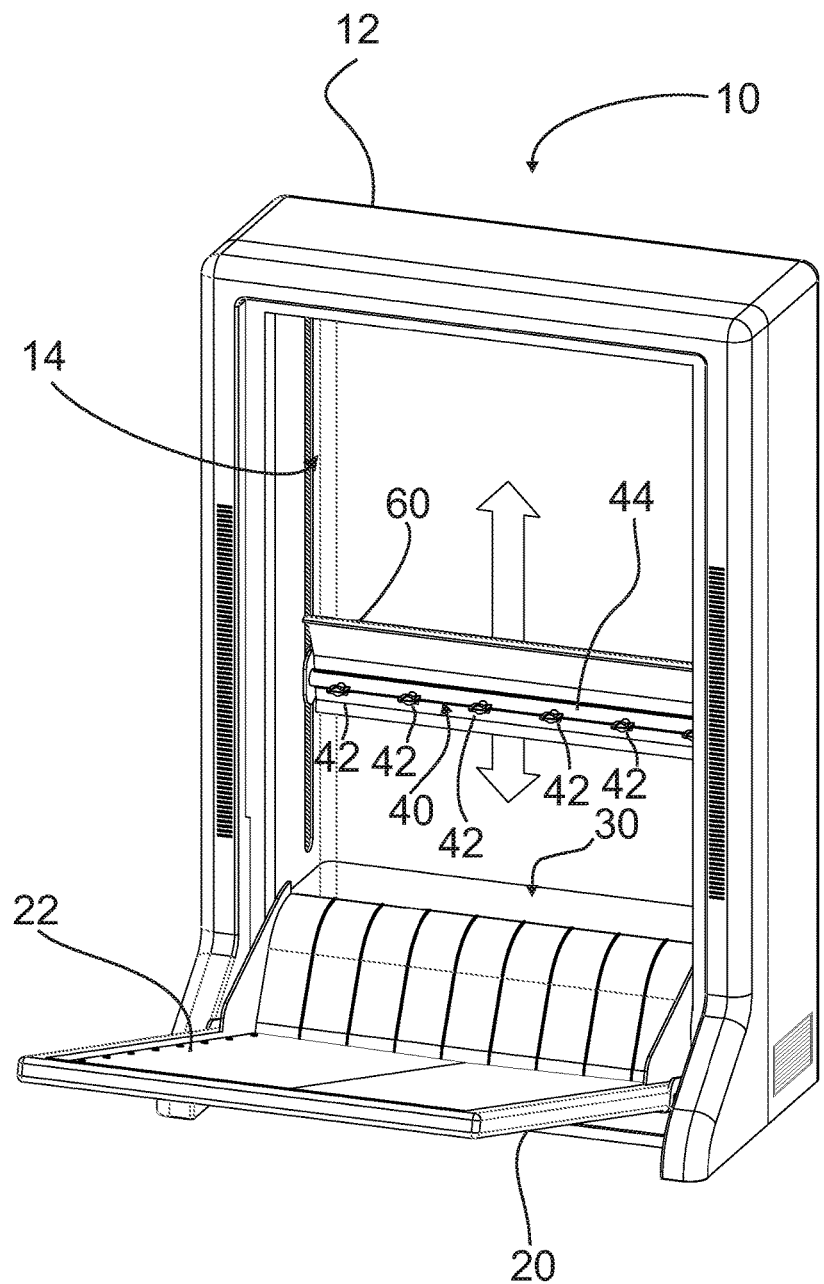
FIG. 2A is a front perspective view of the pet waste collection and disposal apparatus as disclosed in accordance with at least one embodiment herein, with the door disposed in an at least partially open/at least partially closed position.
Figure 2B:
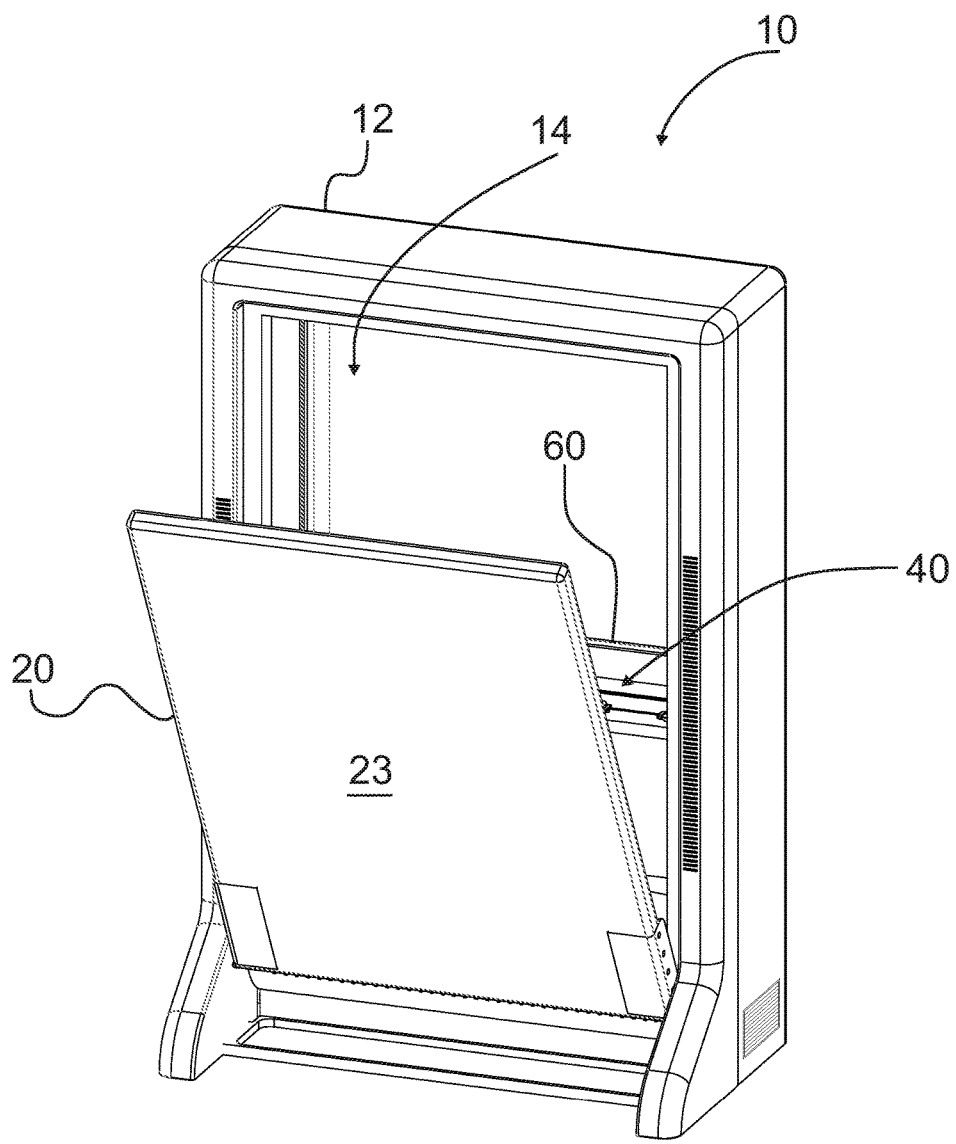
FIG. 2B is another front perspective view of the pet waste collection and disposal apparatus as disclosed in accordance with at least one embodiment herein, with the door disposed in an at least partially open/at least partially closed position.
Figure 2C:
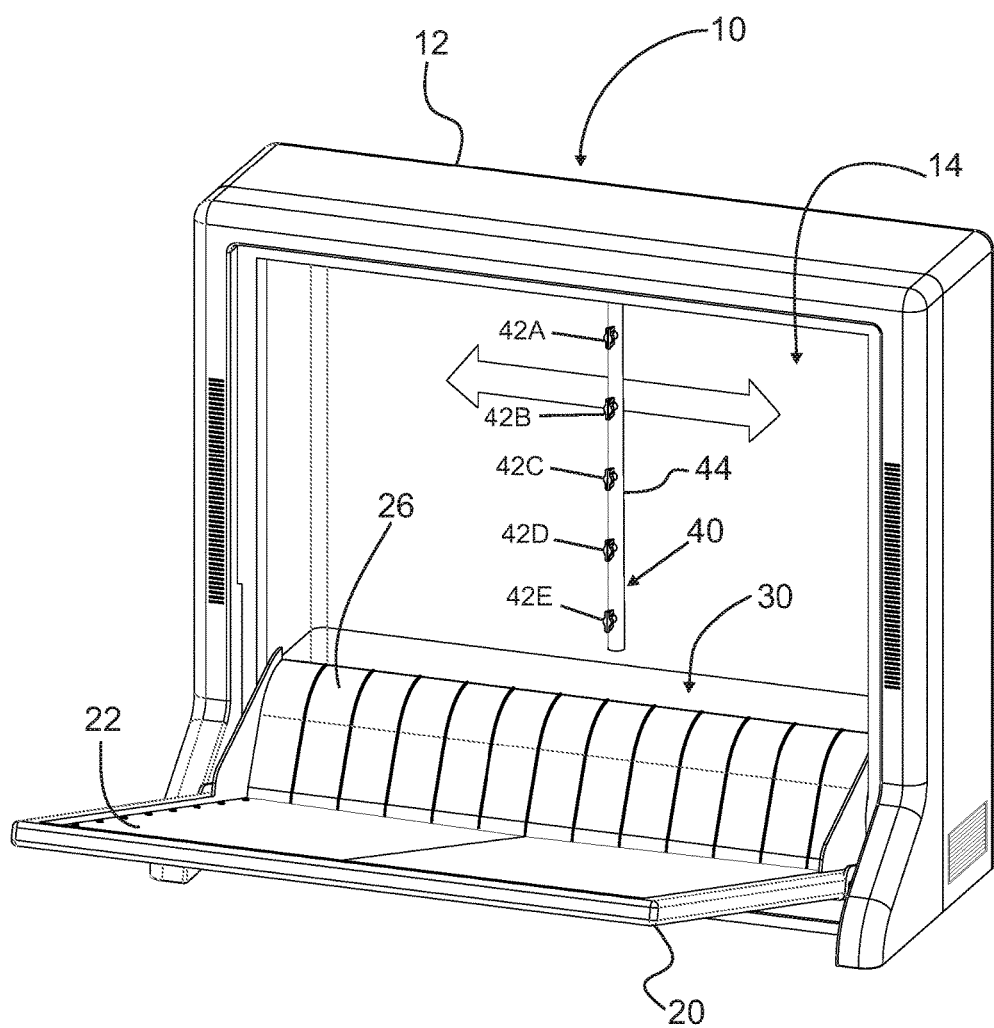
FIG. 2C is a front perspective view of an alternative embodiment illustrating the nozzle assembly being movable in a horizontal or side-to-side direction within the housing.
Figure 3:
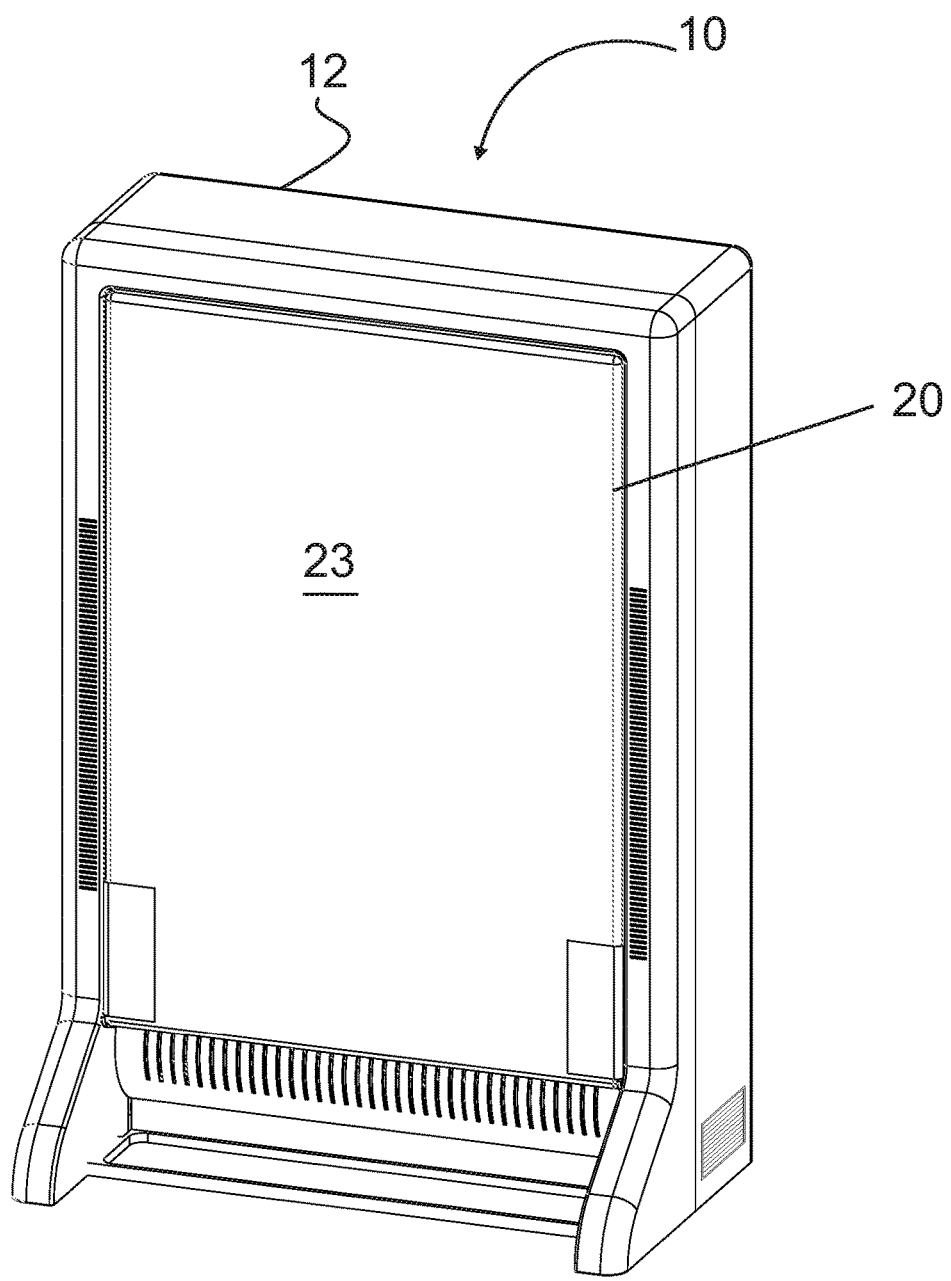
FIG. 3 is a front perspective view of the pet waste collection and disposal apparatus as disclosed in accordance with at least one embodiment herein, with the door disposed in a closed, substantially vertical position.

Furthermore, as shown, for example, in FIG. 2A, the apparatus 10 of the various embodiments includes a basin 30 disposed within the interior portion 14 of the housing or body 12. The basin 30 of at least one embodiment includes an at least partially open top 32 leading into an inner collection area 34 for at least temporarily retaining fluid, referenced as 'F' (e.g., water) (FIG. 5A) and at least temporarily receiving pet waste, referenced as "PW." Furthermore, the basin 30 includes an outlet 36 fluidically and communicatively interconnected to a drain, such as a waste disposal drain integrated as part of the building's plumbing (e.g., sewage or septic tank drain) for flushing or disposing of the pet waste PW, as provided herein.

Figure 4A:
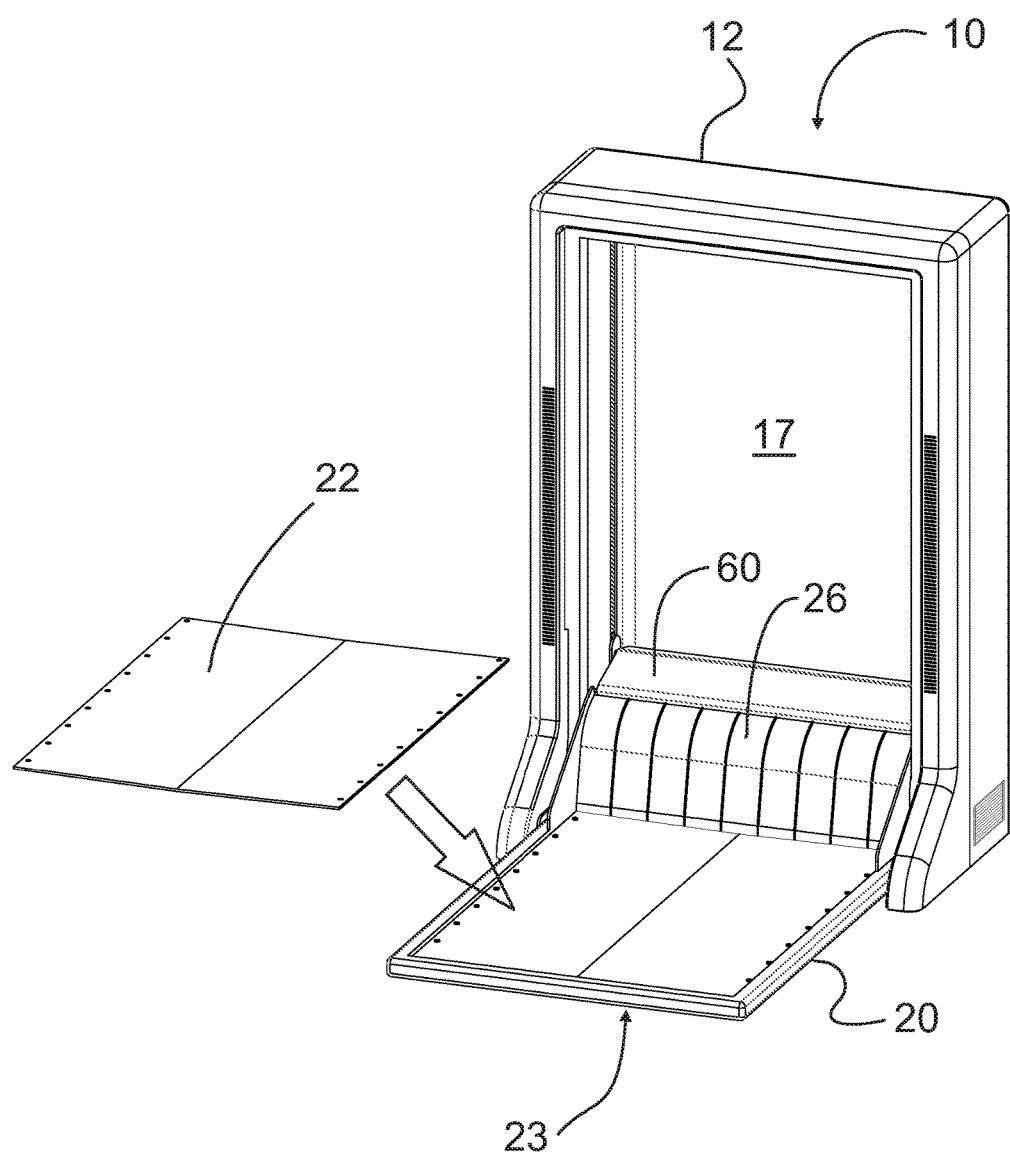
FIG. 4A is a front perspective and partially exploded view of the pet waste collection and disposal apparatus as disclosed in accordance with at least one embodiment herein.

In addition, the door 20 of at least one embodiment of the present invention is configured to define a main collection surface 22 terminating at one end (e.g., the end closest to the housing 12) with a bypass collection surface 26. Particularly, the main collection surface 22 is the surface upon which the pet (e.g., dog, cat, or other animal) will leave the pet waste PW, whether urine or feces. With reference to FIG. 4A, the main collection surface 22 may be removably attached to the door 20, for example, via one or more fasteners, including but not limited to snaps, hooks, hook and loop fasteners (e.g., VELCRO), magnets, etc. This allows the main collection surface 22 to be interchangeable, washed, or replaced, as needed or as desired. In any event, the main collection surface 22 may include artificial or synthetic grass, artificial or synthetic turf, or other like material designed to simulate the look and feel of natural grass or other like surface. It should be noted, however, that the main collection surface 22 of the various embodiments may be made of virtually any material, including, for example, synthetic fibers, plastic, foam, etc., and may include a smooth surface, rough surface, textured surface, or a surface similar to grass, etc.

Figure 4B:
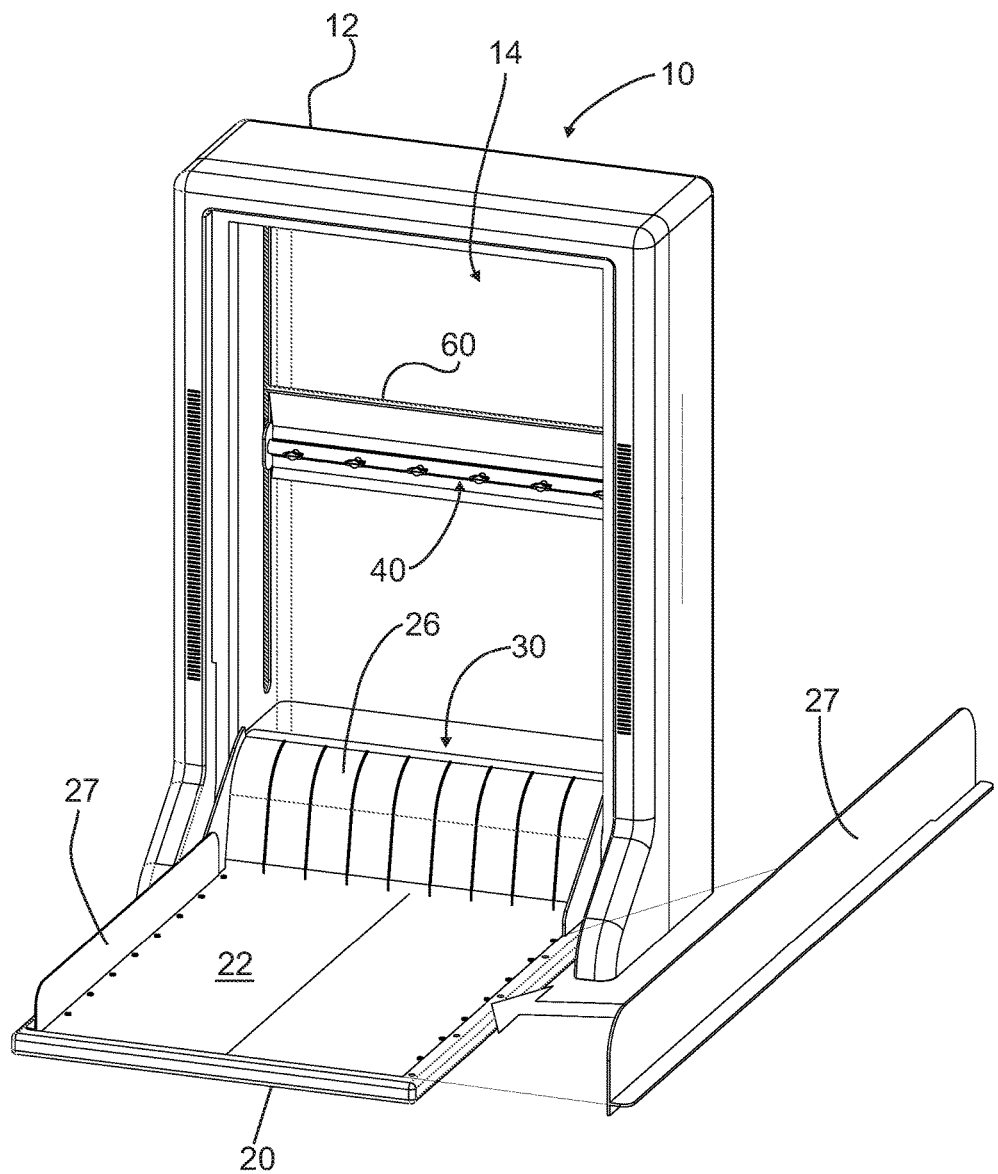
FIG. 4B is another front perspective and partially exploded view of the pet waste collection and disposal apparatus as disclosed in accordance with at least one embodiment herein.

Further features of at least one embodiment may include one or more raised peripheral edges 27, as shown in FIG. 4B, for example. In particular, it may be desired to provide raised edges or walls surrounding the main collection surface 22 or otherwise on at least one peripheral edge of the main collection surface 22 in order to prevent or restrict any fluids or other pet waste from falling or dripping off of the main collection surface 22 and onto the surrounding ground or environment. Furthermore, as some pets, and in particular but not limited to male dogs or canines, may raise a leg while urinating, the raised peripheral edge(s) 27 or wall(s) may provide a surface upon which the animal or pet can urinate while preventing or at least restricting the urine or other pet waste from entering the surrounding environment.

It should be noted that the raised walls or peripheral edges 27 may be integrated or fixedly attached to the door 20 or main collection surface 22 in at least one embodiment. Although, in other embodiments, as shown in the partial exploded view of FIG. 4B, the raised peripheral edges 27 may be removably attached to the door 20 or main collection surface 22, for example, via cooperative snaps, hooks, VELCRO, hook and loop fasteners, adhesive, or other attachment mechanism. The removable attachment may allow the pet owner to customize the apparatus 10 depending on the particular pet or animal using the apparatus, for example.

As best shown in the side and partially transparent views of FIGS. 5A through 5H, the bypass collection surface 26 is positionable in a movably, at least partially overlapping relation with a corresponding lip 38 of the basin 30, such as a leading lip facing the front or open end of the body 12. For instance, the bypass collection surface 26 is moved toward the inner collection area 34 of the basin 30 and at least partially over the lip 38 as the door 20 is positioned from the open position into the closed position. In some embodiments, the bypass collection surface 26 includes an at least partially angled or curved configuration, angled or curved in a direction away from the main collection surface 22 and in a direction toward the basin 30. This will help facilitate the transfer of the pet waste PW from the main collection surface 22, over the bypass collection surface 26 and into the basin 30 for disposal.

Figure 5A:
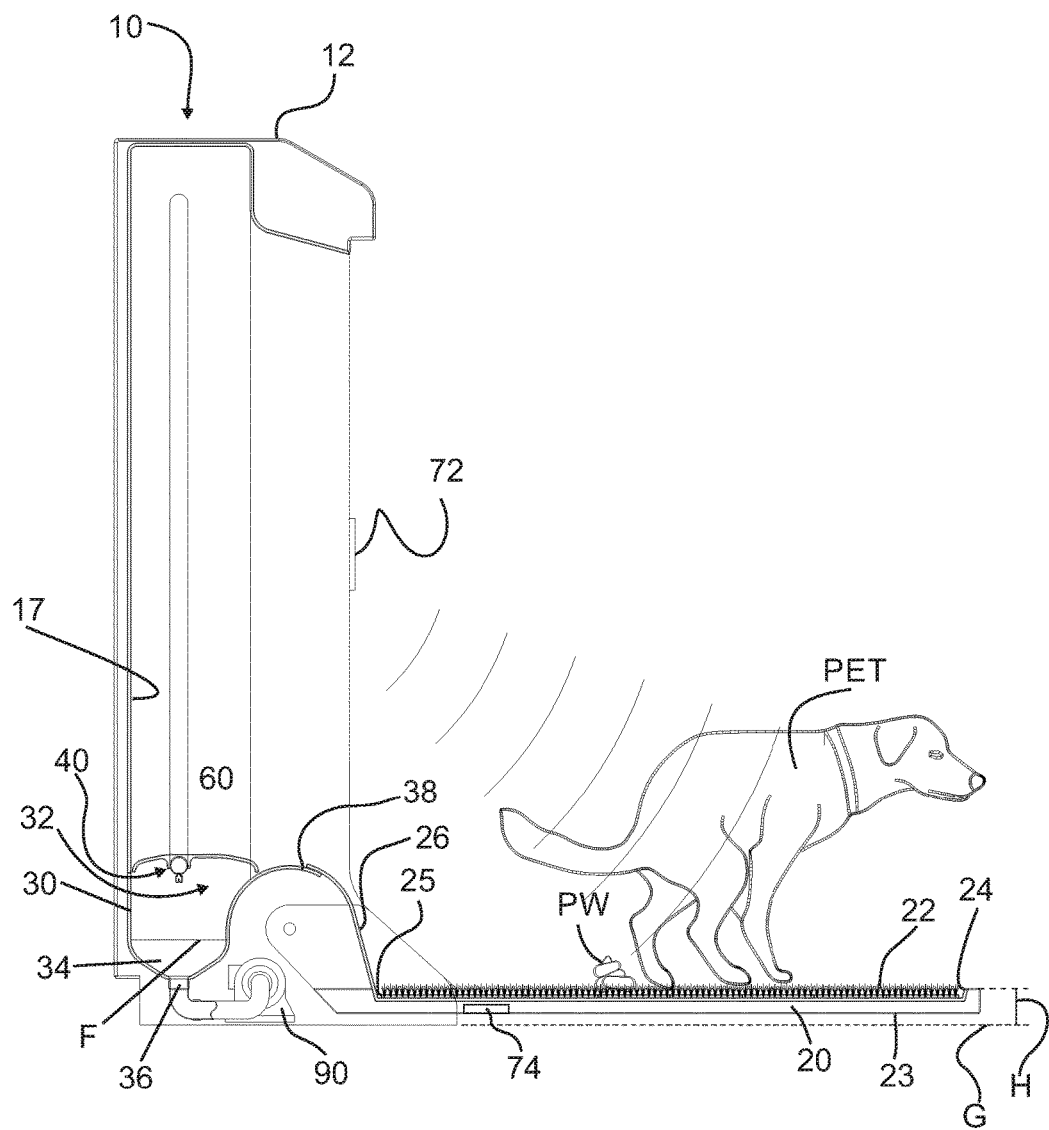
FIG. 5A is a side, at least partially transparent view of the pet waste collection and disposal apparatus as disclosed in accordance with at least one embodiment herein, with the door disposed in an open position and a pet using the apparatus.

In addition, with reference to FIG. 5A, in some embodiments the main collection surface 22 of the door 20 is disposed below an upper end of the lip 38 of the basin when the door 20 is disposed in the open or substantially outwardly extending position. Particularly, the main collection surface 22 of the door 20 of at least one embodiment is only slightly elevated off of the surrounding ground or support surface, or is otherwise low to the ground and in some cases flat on the ground, meaning that the pet does not have to climb or step high off of the ground in order to step onto the main collection surface 22.

For instance, in some embodiments, the main collection surface 22 may include a height H, measured from or otherwise defined as the distance between the ground or surrounding surface G to the top of the main collection surface 22. The height H or distance between the main collection surface 22 and the ground G or surrounding support surface may be relatively small, and in some cases, less then approximately six (6) or eight (8) inches. Particularly, in some embodiments, the height H of the main collection surface 22, when the door 20 is open, may be approximately two (2) inches, approximately three (3) inches, or approximately three and a half (3.5) inches. However, is it contemplated that the height H of the main collection surface 22, when the door 20 is open, may be less than two (2) inches, or greater than three and a half (3.5) inches. For example, the height H, may, in some embodiments be a few as one (1) or two (2) inches and as great as six (6) or eight (8) inches. Accordingly, when the main collection surface 22 is low to the ground G and/or disposed a distance of between approximately two (2) and eight (8) inches from the ground G, the dog or animal can easily and effortlessly step onto the main collection surface 22 when the door 20 is open and leave pet waste PW, as shown in FIG. 5A.

It should be noted that while the door 20, and in particular, the outer surface 23 of the door 20, may be disposed flat upon the ground, such that the surface 23 of the door 20 may contact or engage the ground G when the door 20 is open, it is contemplated that in some embodiments, the surface 23 may be slightly raised off of the ground G, even when the door 20 is open.

It should also be noted that in some embodiments, while the door 20 may be flat on the ground (e.g., an outer surface 23 of the door 20 may be flat or substantially flush or parallel with the ground), in some cases, the main collection surface 22 may be slightly angled or tilted (for example, in a direction down toward the bypass collection surface 26), such that an outer end 24 of the main collection surface 22 may be slightly higher than an inner end 25 thereof. This can allow or otherwise facilitate urine or other fluids flowing toward the bypass collection surface 26. Furthermore, the bypass collection surface 26 allows the door 20 to remain low to the ground, for instance, lower than the lip 38 of the basin 30, and in some embodiments, lower than the open top portion 32 of the basin 30. Particularly, the bypass collection surface 26 will allow the pet waste PW to slide off of the main collection surface 22 via gravity (as the door 20 is closed) and into the basin 30 over the lip 38.

Referring back to FIG. 2A, the apparatus 10 further includes a nozzle assembly 40 disposed within the interior portion 14 of the housing or body 12. For instance, the nozzle assembly 40 may be used to rinse the main collection surface 22 of the door 20 in order to clean the surface 22 from any pet waste PW that may have been left thereon. Particularly, the nozzle assembly 40 of at least one embodiment includes one or more spray nozzles 42 for directing a flow of fluid or water toward the main collection surface 22 of the door 20 when the door 20 is disposed in the closed position. As shown in FIG. 2A, the nozzle assembly 40 includes a plurality of spray nozzles 42 disposed in a spaced relation along a length of a spray tube 44.

Furthermore, in some embodiments, the nozzle assembly 40 may be movable within the interior portion 14 of the housing 12 in a manner such that the nozzle(s) 42 can spray fluid or water upon the entire or a substantial portion of the surface of the main collection surface 22. For instance, the nozzle assembly 40 may move in a linear direction within the housing or body, such as, for example, in a substantially vertical or up and down manner as shown by the arrows in FIG. 2A or in a substantially horizontal or side-to-side manner as shown by the arrows in FIG. 2C. Other movements of the nozzle assembly 40, whether linear or non-linear, or whether vertical, horizontal or angled, are contemplated within the full spirit and scope of the various embodiments of the present invention.

Figure 6A:
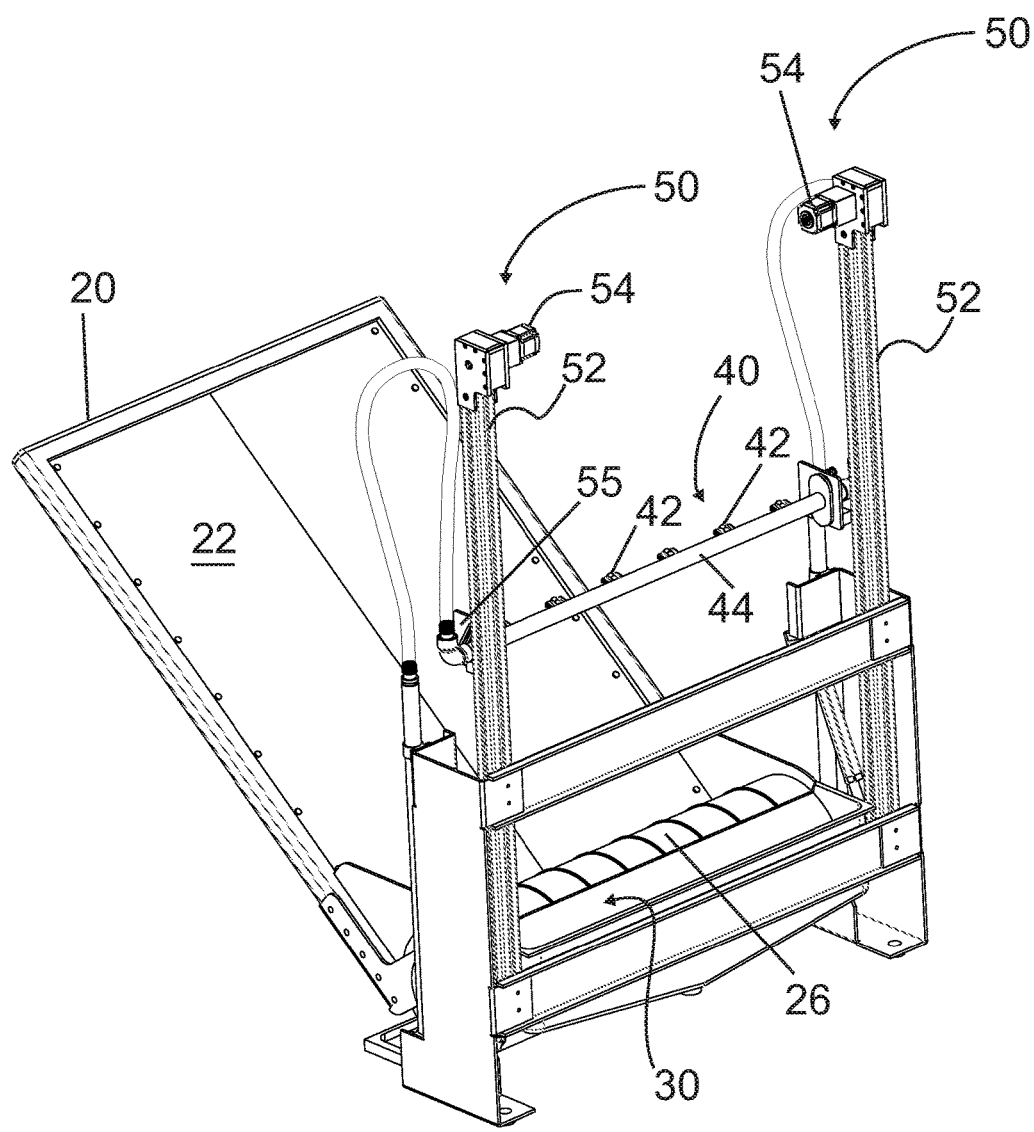
FIGS. 6A, 6B and 6C are a partial interior views of the pet waste collection and disposal apparatus showing the positioning assembly as disclosed in accordance with at least one embodiment of the present invention.
Figure 6B:
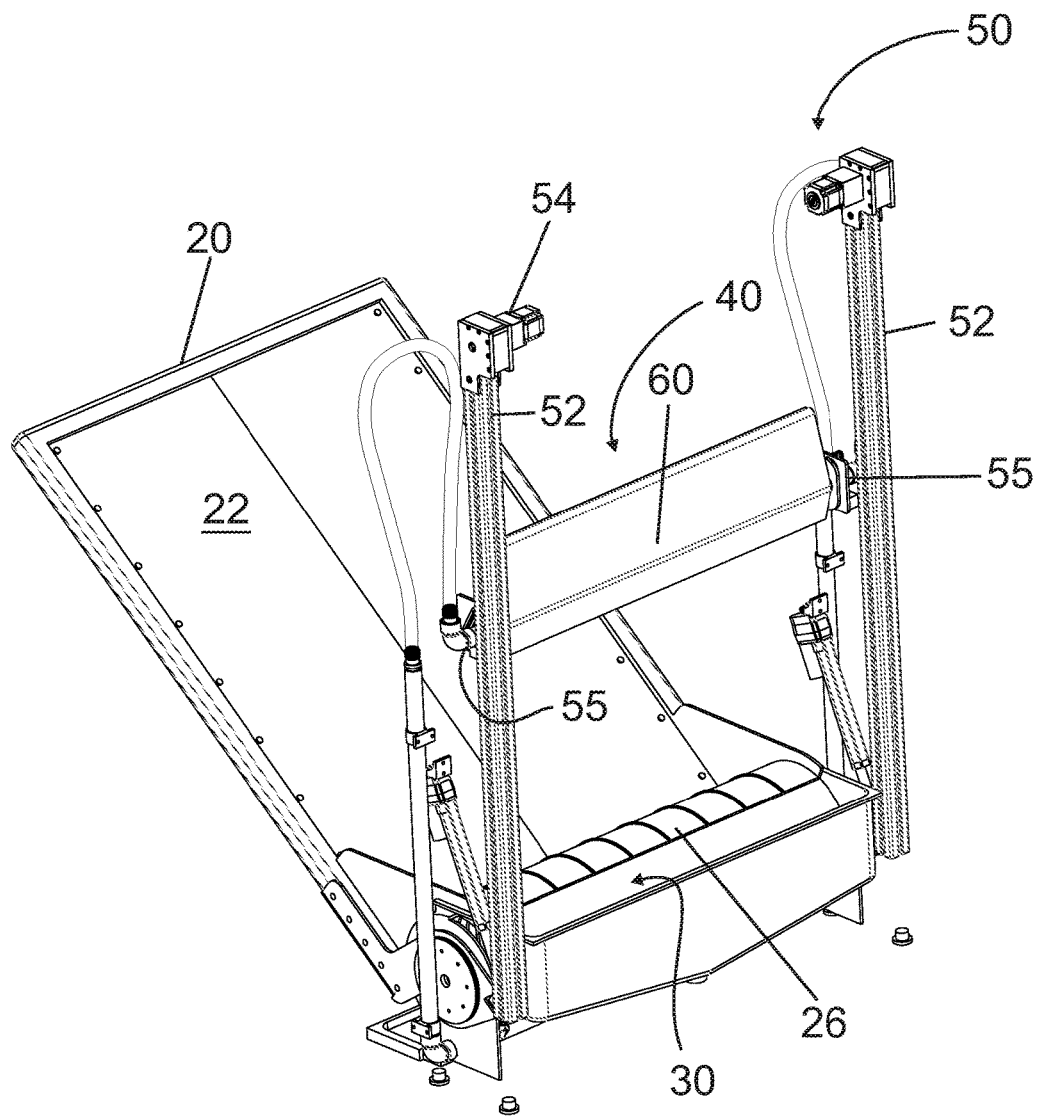
Figure 6C:
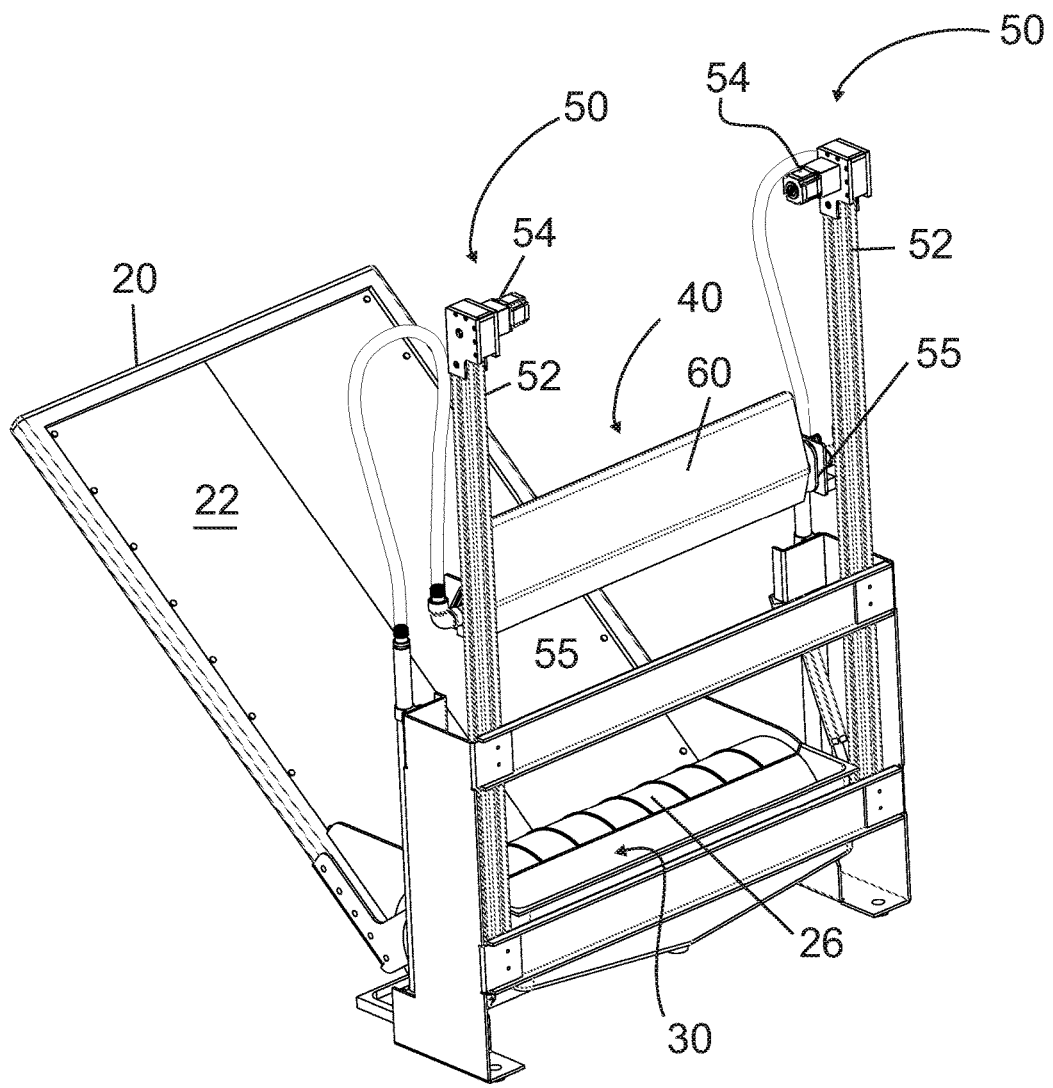

Moreover, a positioning assembly 50 may be included and structured to position the nozzle assembly 40 in a movable (e.g., vertical or up and down and/or horizontal or side-to-side) relation within the housing 12. As shown in FIGS. 6A through 6C, for example, the positioning assembly 50 of at least one embodiment may include one or more rails 52 disposed on opposite sides of the spray tube 40 and interconnected to the spray tube 40 via one or more brackets 55.

Furthermore, one or more motors 54, such as a step motor or other like device, may be used to position the bracket(s) 55 and/or spray tube 40 along the rails 52 thereby positioning the nozzle assembly 40 in a movable relation within the housing 12.

In some embodiments, the nozzle assembly 40 may also be at least partially rotatable, for example, about a horizontal or other axis, such that the one or more nozzles 42 may be disposed in a plurality of angular positions. For instance, the nozzles 42 may be disposed in a first position defined as being directed substantially outward or toward the main collection surface 22 and/or bypass collection surface 26 of the door (e.g., FIGS. 5D, 5E and 5F). In some embodiments, the nozzle assembly 40 may be rotatable, for example, downward, into a second position defined as being directed substantially toward the basin 30, or the inner collection area 34 thereof (e.g., FIG. 5G).

In yet another embodiment, the nozzle assembly 40 may include a shield or cover 60 that is attached to and rotatable with the nozzle tube 44. Specifically, when the nozzle assembly 40 is disposed or positioned at a lower or bottom location within the interior portion 14 of the housing (e.g., FIG. 5A), the nozzle assembly 40 may be rotated in a manner such that the nozzle(s) 42 face or point in a substantially downward position. In this manner, the attached shield or cover 60 of at least one embodiment will also rotate with the nozzle assembly 40 and will substantially or completely cover the basin 30. For instance, the shield or cover 60 may be configured such that it will span between the inner rear surface 17 of the housing 12 and the front lip 38 of the basin (e.g., FIG. 5A), and between the two oppositely disposed inner side walls 16 (FIG. 1A and 4) in a manner to substantially cover the at least partially open top portion 32 of the basin 30. In some embodiments, the nozzle assembly 40 will be disposed in this position (i.e., in a position such that the shield or cover 60 is disposed in a covering relation to the basin 30) when the door 20 is disposed in the open or substantially outwardly directed position. This will, thus, shield or block the pet from tampering with the basin 30 and will also protect the basin 30 from any extraneous debris or external particles that may otherwise come in while the door 20 is open.

Figures 7A, 7B:
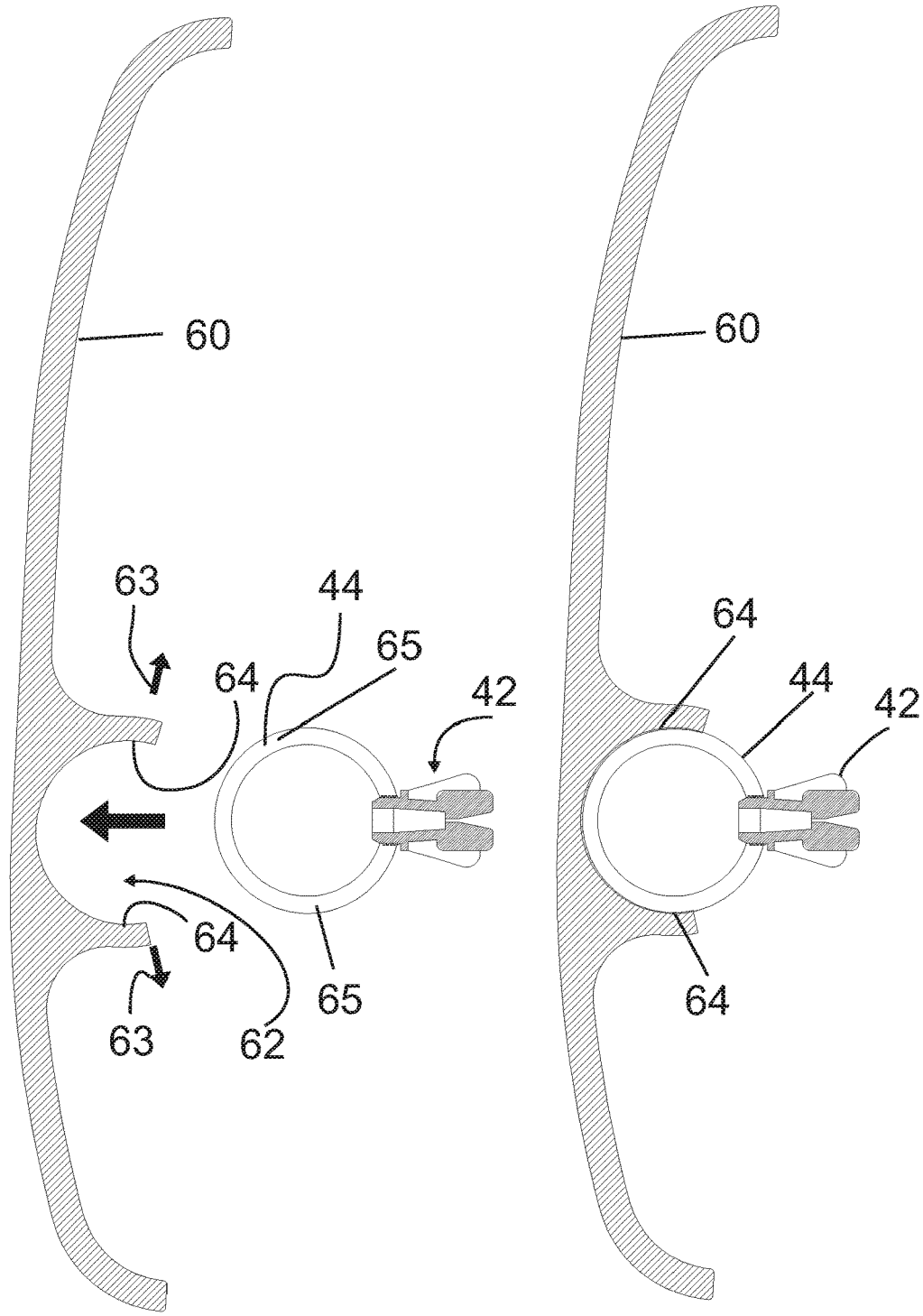
FIG. 7A is an exploded, side cut-away view of the nozzle assembly showing the interconnection between the spray tube and the shield/cover.
FIG. 7B is a side, cut-away view of the nozzle assembly showing the interconnection between the spray tube and the shield/cover.

With reference to FIGS. 7A and 7B, for example, the shield 60 may include a receiving clip portion 62 for engaging or receiving the spray tube 44 therein. Arms 64 of the receiving clip portion may flex or bend partially outward, as shown by arrows 63, for example, when the tube 44 is positioned therein. The receiving clip portion 62, and in particular the arms 64 thereof, can thus frictionally or otherwise engage the tube 44, for example, at or near sides 65. In some embodiments, the clip 62 and/or arms 64 thereof, as well as the tube 44, may include cooperative notches, grooves, teeth, or other like structures that may be used to facilitate a tight and/or secure interconnection between the clip 62 and the tube 44. Other ways of attaching the shield 60 to the tube 44 or nozzle assembly 40 are contemplated within the full spirit and scope of the present invention. Accordingly, as the tube 44 rotates or otherwise moves within the housing 12, as described herein, the shield 60 will also rotate and move therewith.

With reference now to FIGS. 5A through 5H, the sequence of steps in accordance with at least one embodiment of the present invention is described and shown. For example, in FIG. 5A, the apparatus 10 is ready for use (and is being used, as shown) in that the door 20 is disposed in the open, and substantially outwardly extended position relative to the body 12. As shown, the door 20 and the main collection surface 22 are low to the ground. The main collection surface 22 is also positioned below the upper lip or open end of the basin 30—this is accomplished via the cooperative construction of the bypass collection surface 26 and the lip 38 of the basin 30. Furthermore, as shown, the nozzle assembly 40 is positioned in the lower position and rotated such that the nozzles 42 are facing downward and the shield 60 is in an at least partially covering or protecting relation with the basin 30. In this manner, the pet is not able to tamper with the basin 30 while the door 20 is open.

In some embodiments, one or more sensors are included, such as, for example, a motion sensor, generally referenced as 72, directed toward or otherwise monitoring the main collection surface 22 of the door 20. For instance, the motion sensor 72 of certain embodiments is structured to detect the presence of an animal or pet that may be on or near the main collection surface 22. In this regard, a control assembly or computer processing system of the apparatus can receive the signals from the motion sensor and control the opening and/or closing of the door 20 and/or the start of a cleaning cycle based thereupon. For instance, when there is a pet or animal on the main collection surface 22, as detected by the one or more motion sensors 72, the control assembly will refrain from closing the door 22. When the motion sensor(s) 72 or other sensor(s) identify that the animal or pet has left the main collection surface 22, the door 20 can close and begin the cleaning cycle.

While some embodiments may automatically operate the door 20 and/or cleaning cycle based on the motion sensor 72 (and no other sensors), it should be noted that the apparatus of other embodiments may include other sensors, in addition to or instead of the motion sensor 72. For instance, some embodiments may include one or more moisture sensors, generally represented as 74, which may be disposed in one or more locations, such as, for example, under or near the main collection surface 22. The moisture sensor 74 may be structured to detect the presence of moisture, fluid or liquid upon the main collection surface 22, suggesting the presence of urine or other like fluids. In some embodiments, the moisture sensor 74 may be located at or near an inner end 25 of the main collection surface 22 in that, as provided herein, the main collection surface 22 may be slightly sloped downward toward the inner end 25 from an outer end 24. This may cause any urine, fluid or moisture to flow toward the inner end 25 and toward the moisture sensor 74. In other embodiments, it is contemplated that the main collection surface 22 may be sloped or slanted in one or more other directions, wherein one or more moisture sensors 74 may be positioned in a manner to effectively receive or detect moisture, for example, as the moisture or liquid travels down the sloped or slanted surfaces toward the sensor(s) 74. Detection of moisture or liquid may, in some instances, trigger a cleaning cycle, as provided herein.

Figure 8A:
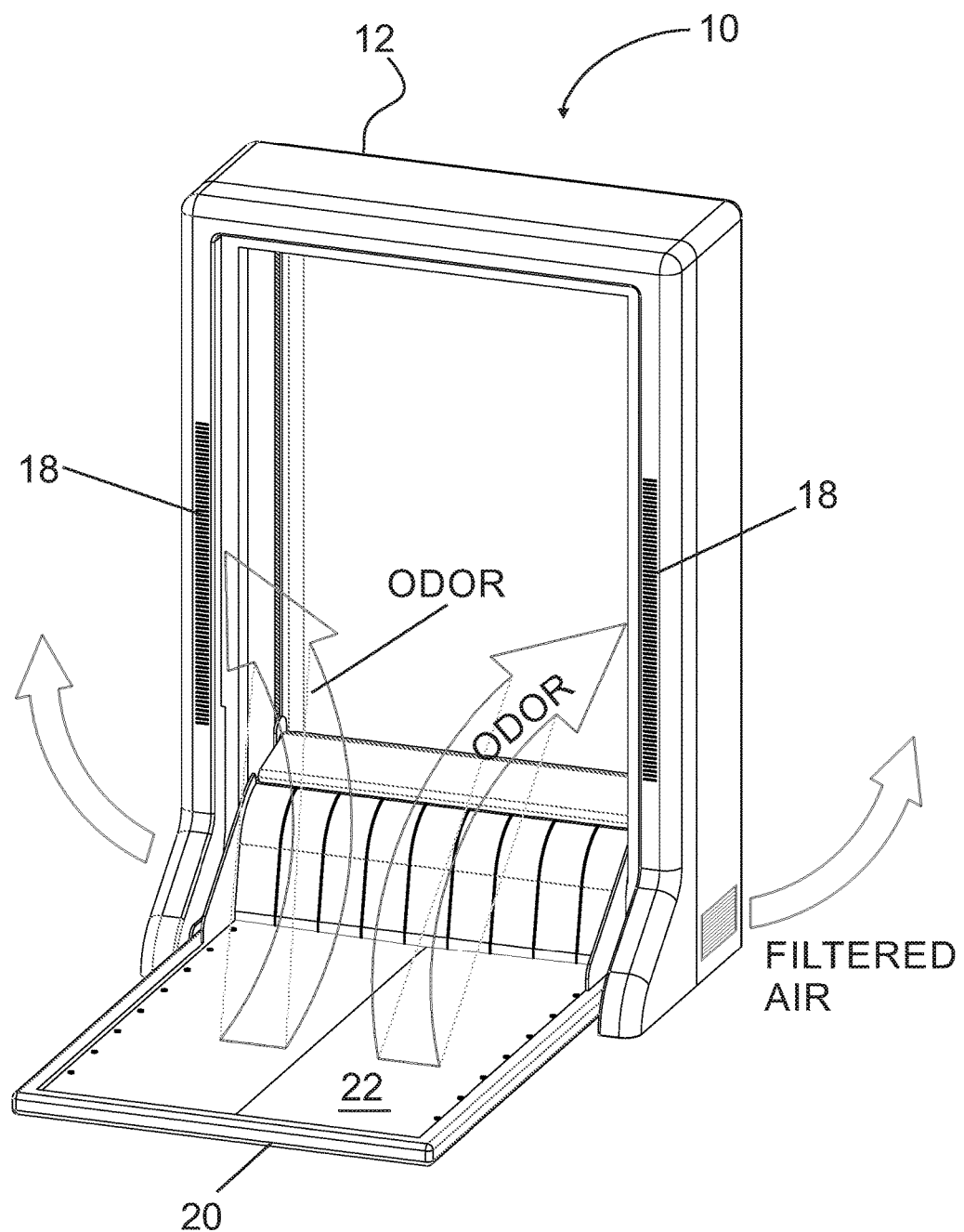
Figure 8B:
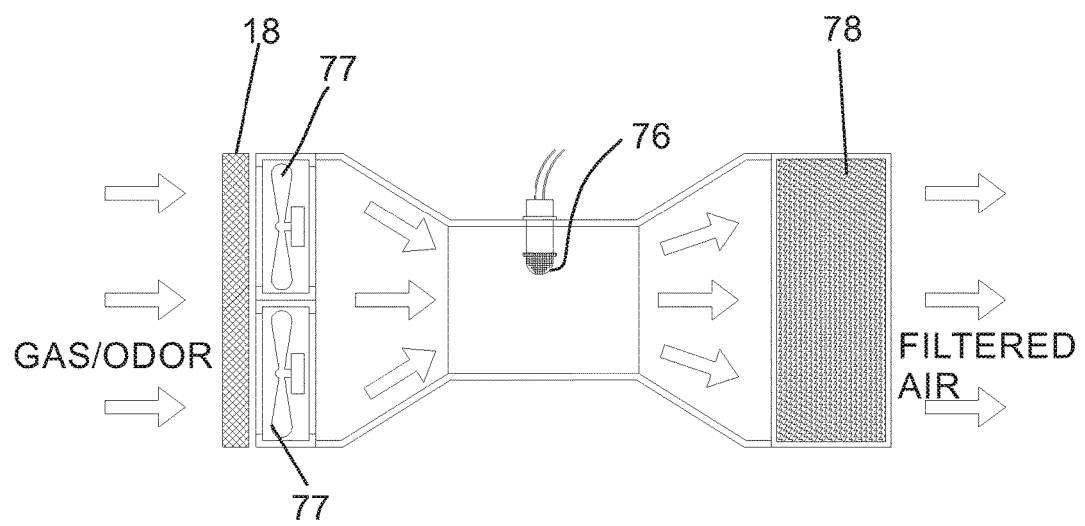
FIG. 8B is a schematic representation of the flow of gas though at least one embodiment of the pet waste collection and disposal apparatus disclosed herein.

With reference briefly to FIGS. 8A and 8B, additional embodiments may include one or more gas and/or odor sensors 76 capable of detecting flatulence odors, including but not limited to sulphur, hydrogen sulphide, methanethiol, and dimethyl sulphide. For instance, the housing or body 12 of at least one embodiment may include one or more vents or openings 18 facing the front or main collection surface 22 of the door 20. One or more fans 77 disposed in a communicative relation with the vents or openings 18 (e.g., disposed on the inside of the vents or openings 18) may be used to draw air through the vents or openings 18 and over one or more gas or flatulence sensors 76. A filter, such as an activated carbon or charcoal filter 78, or one or more air fresheners may intercept the air before it is released back into the room or atmosphere, as schematically shown in FIG. 8B, for example.

In this regard, the various sensors, such as, for example, the motion sensor(s) 72, moisture sensor(s) 74 and/or gas or odor sensor(s) 76, either alone or in combination with one another, may be used to control the automatic activation of the apparatus 10, such as, the automatic closing of the door 20 and beginning of the cleaning cycle, as described herein. For instance, in some embodiments, the cleaning cycle may automatically begin after every confirmed use, only when flatus is detected by the gas or odor sensor(s) 76, when flatus is detected or after a predetermined number (e.g., three) confirmed urine uses, or periodically (e.g., every four hours) (but allowing to dismiss cleaning if no confirm use since the last cleaning). Other embodiments may automatically begin the cleaning cycle when motion is detected, after motion is detected, after a certain amount of time (e.g., one minute) after motion is not detected any longer, etc.

Figure 5B:
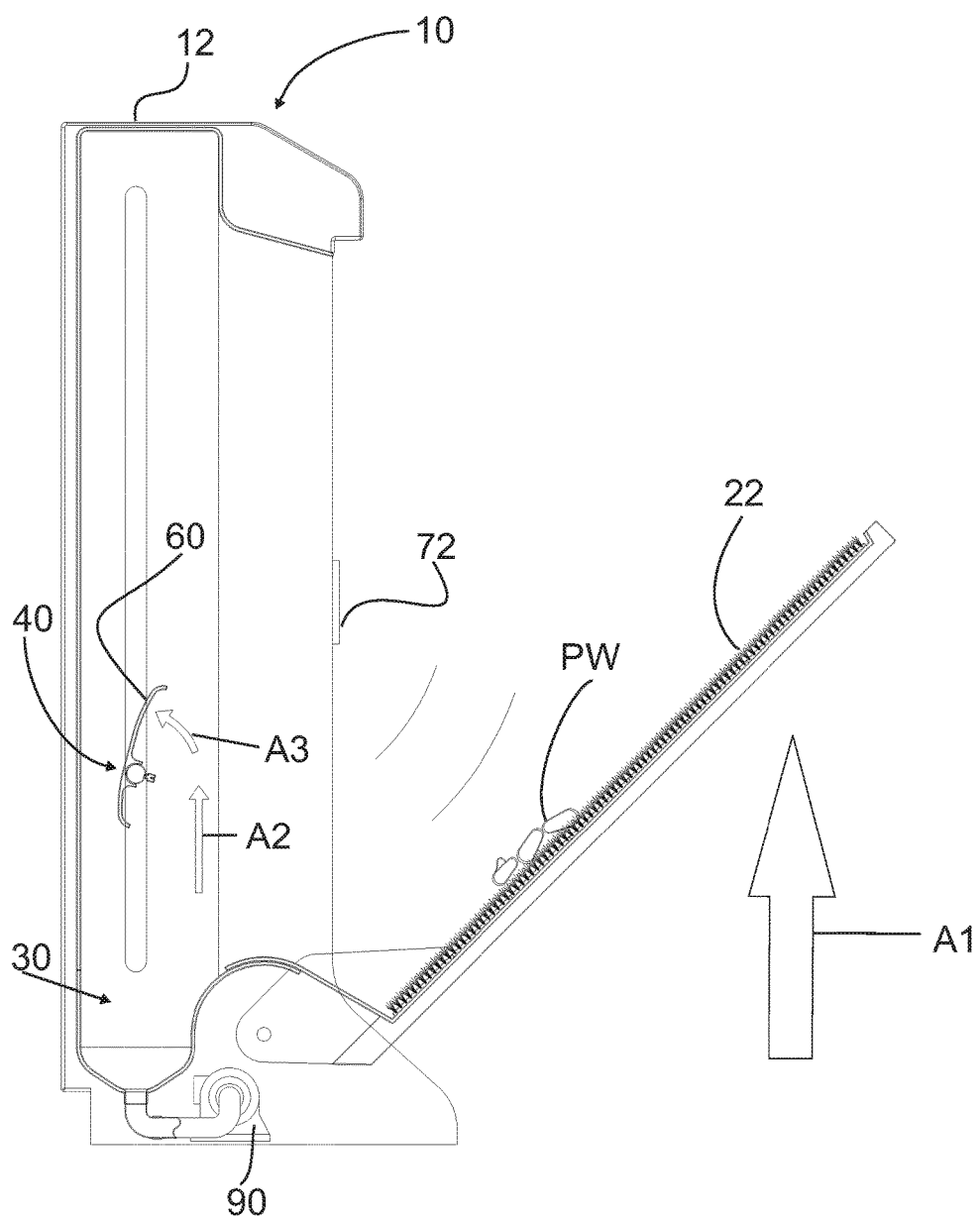
FIG. 5B a side, at least partially transparent view of the pet waste collection and disposal apparatus as shown in FIG. 5A with the door being disposed from the open position to the closed position.

In any event, with reference to FIG. 5B, when the cleaning mode or cleaning cycle is activated, the door 20 will begin to close, i.e., the door 20 will pivot upward from its extended position to the upward, closed position, as shown by arrow A1. If there is movement on the door 20 or close to the machine, for example, as detected by one or more motion sensors 72, the movement of the door 20 will stop (or in some cases, the door 20 will reverse and open) until it is safe to continue to close. Also, the nozzle assembly 40 will begin to move upward, as shown by arrow A2, and rotate as shown by arrow A3, in order to direct the nozzle(s) 42 toward the main collection surface 22.

Figure 5C:
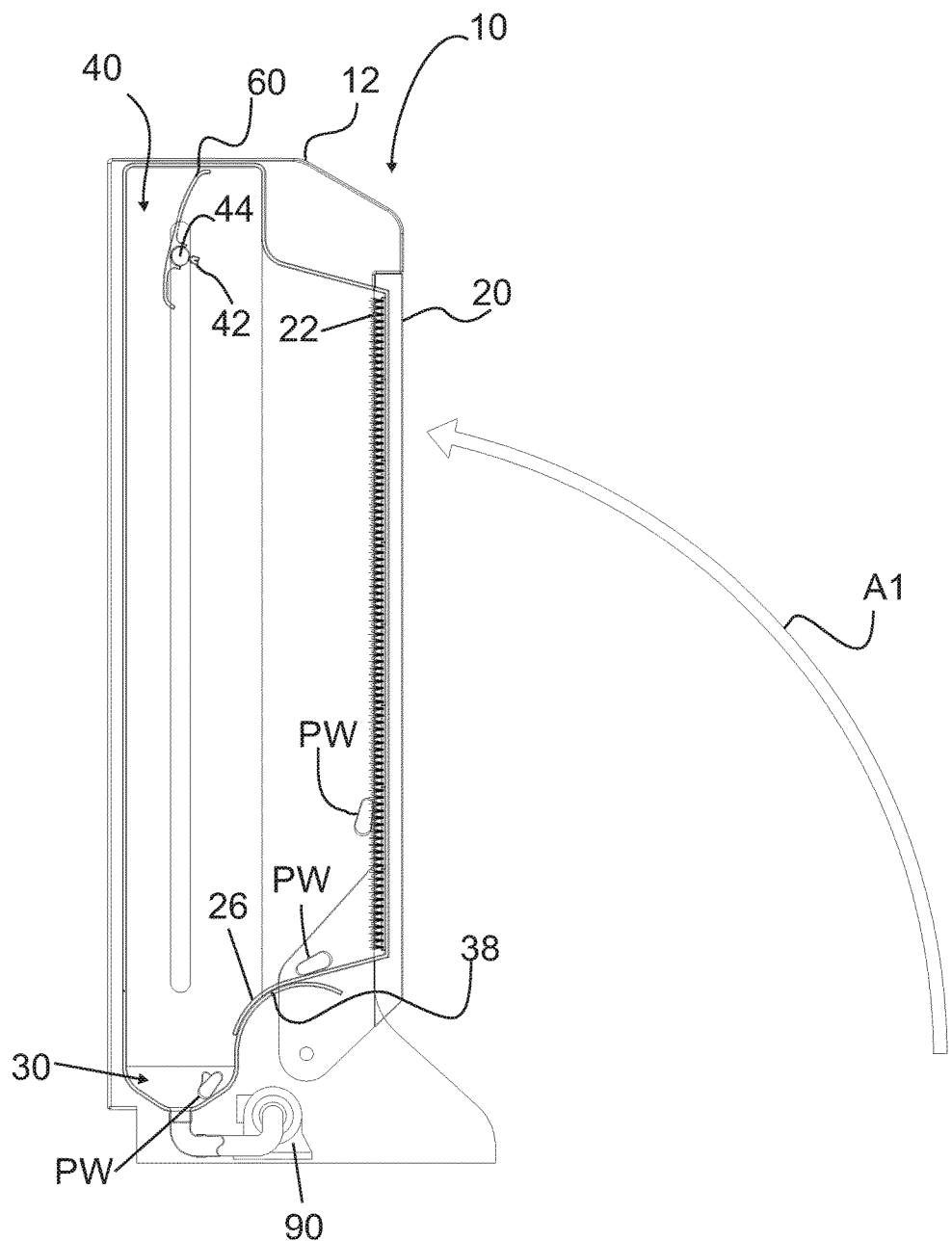
FIG. 5C a side, at least partially transparent view of the pet waste collection and disposal apparatus as shown in FIGS. 5A and 5B, with the door disposed in the closed position.

In FIG. 5C, the door 20 is disposed in the closed position, and the nozzle assembly 40 is positioned in a manner such that the nozzle(s) 42 are directed toward the main collection surface 22. As shown, the nozzle assembly 40 will be positioned in an uppermost locations within the housing, or otherwise directing or pointing the nozzle(s) 42 toward the uppermost end of the main collection surface 22. In some embodiments, a locking mechanism will be included such that the door 20 may be locked shut or otherwise locked in the closed position. Also, as shown, the bypass collection surface 26 is disposed in an overlying relation relative to the lip 38 of the basin 30, such that gravity will force at least some of the pet waste PW to fall off of the main collection surface 22, along the bypass collection surface 26 and into the basin 30, as shown in FIG. 5C.

Figure 5D:
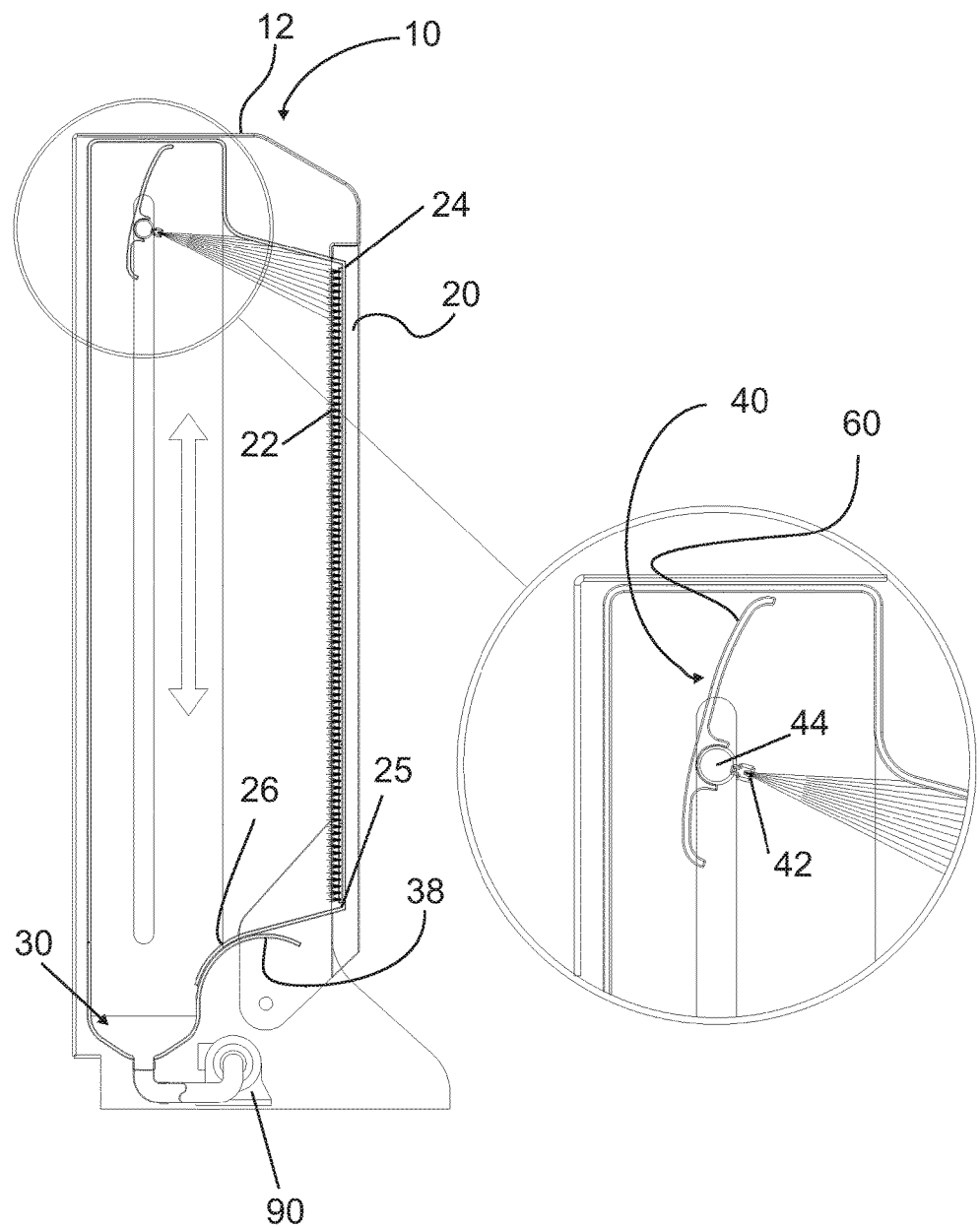
FIG. 5D a side, at least partially transparent view of the pet waste collection and disposal apparatus as shown in FIGS. 5A through 5C with the nozzle assembly spraying fluid onto the main collection surface of the door.

In FIG. 5D, the nozzle assembly 40 is activated such that high pressure water or other fluid will flow through the nozzle assembly 40 and be directed to the main collection surface 22. In some embodiments, a solvent, such as a soap, detergent, etc. may be mixed with the water or fluid in order to facilitate the cleaning or washing of the main collection surface 22 and other portions of the apparatus 10.

Figure 5E:
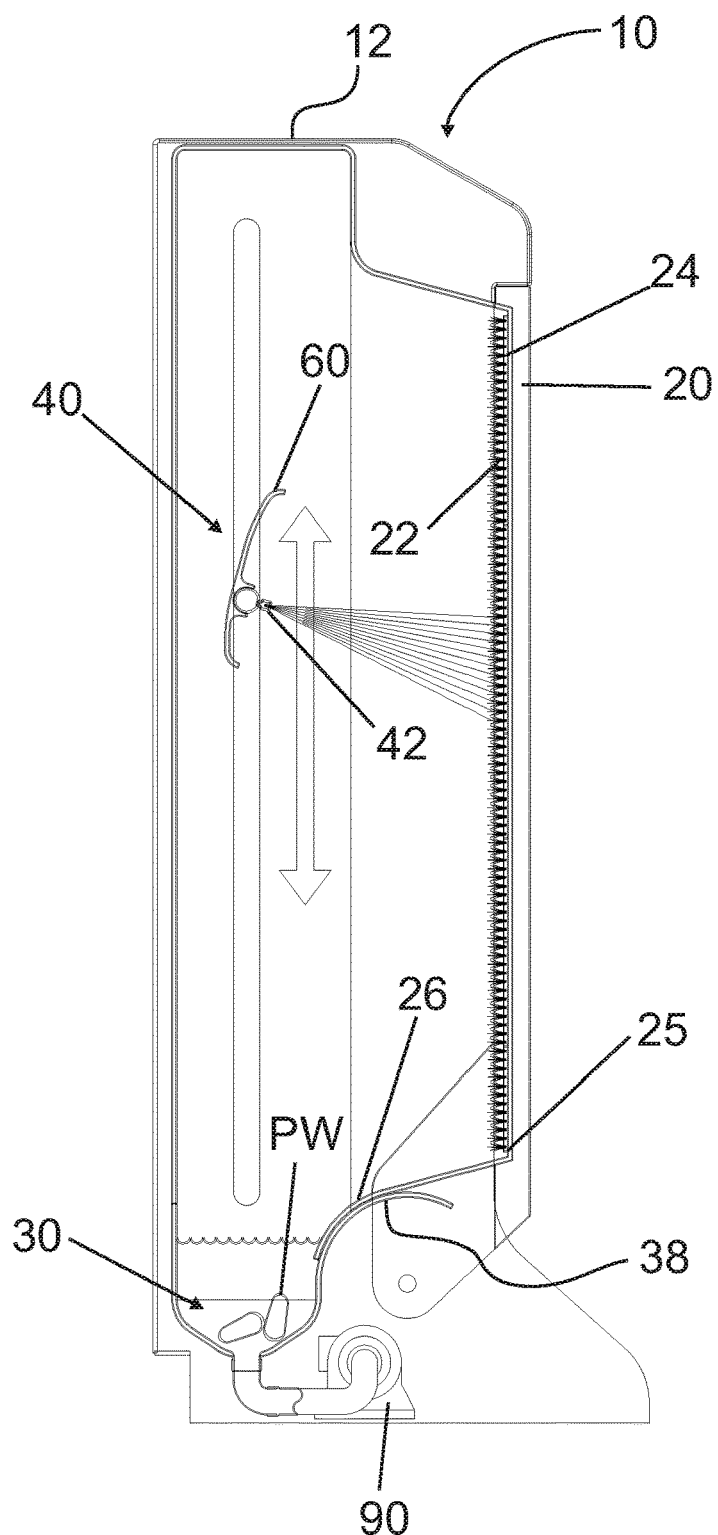
FIG. 5E is another side, at least partially transparent view of the pet waste collection and disposal apparatus as shown in FIGS. 5A through 5C with the nozzle assembly spraying fluid onto the main collection surface of the door.
Figure 5F:
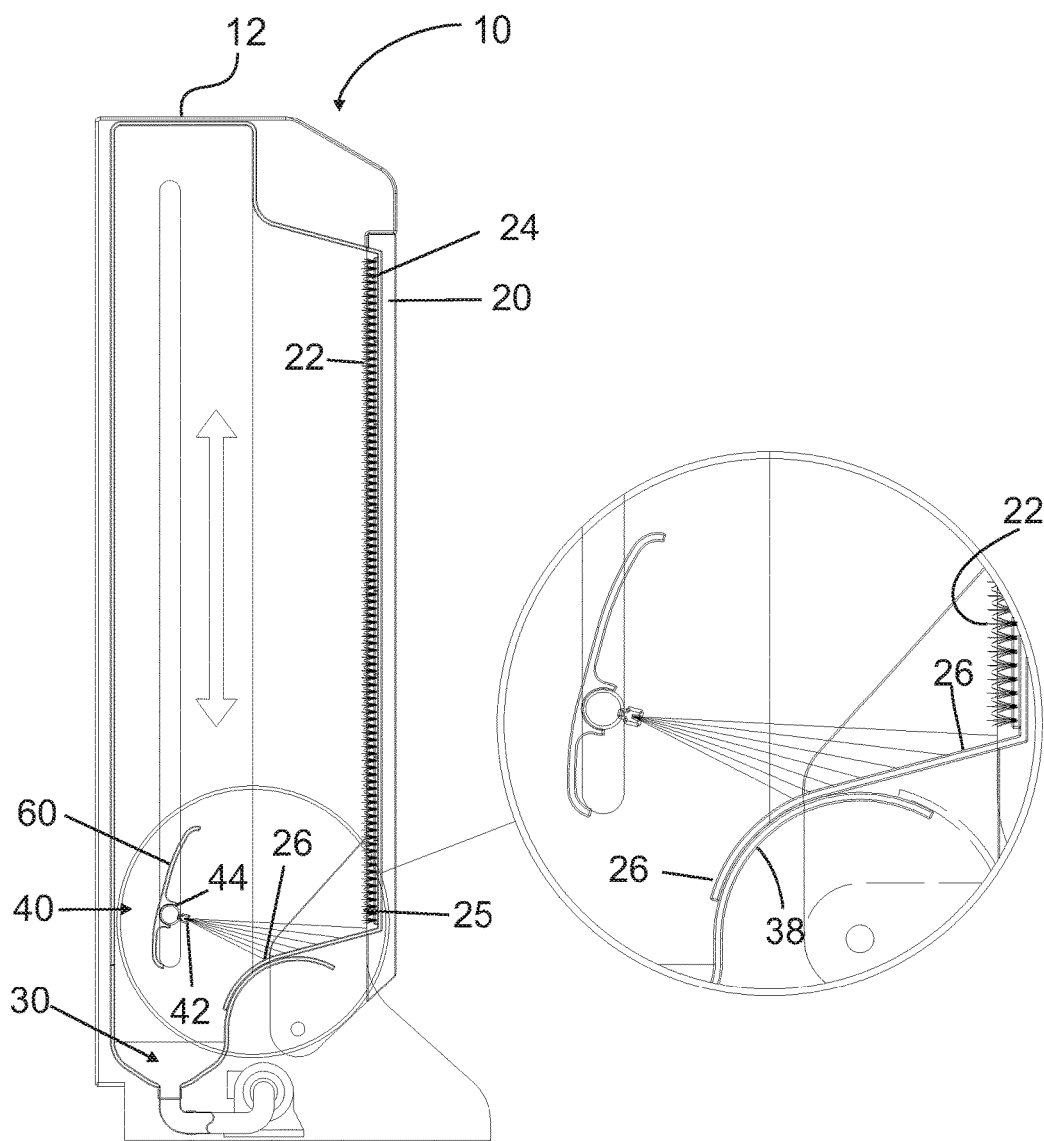
FIG. 5F is a side, at least partially transparent view of the pet waste collection and disposal apparatus as shown in FIGS. 5A through 5E with the nozzle assembly spraying fluid onto the bypass collection surface.

For instance, with reference to FIGS. 5D, 5E and 5F, the nozzle assembly 40 of at least one embodiment will move linearly, for example, vertically, spraying fluid upon the main collection surface 22 and, in some cases, the bypass collection surface 26, in order to cleanse or wash the surface(s) and force any pet waste into the basin 30. In some embodiments, the entire surface or at least a substantial portion of the main collection surface 22 (from one end to the other end) will be exposed to high pressure fluid from the nozzle assembly 40 as the nozzle assembly 40 moves (e.g., vertically) within the housing. As shown in FIGS. 5D through 5F, the nozzle assembly 40 in at least one embodiment will spray the main collection surface 22 from an outer, top or uppermost end (e.g., reference 24 in FIG. 5D) and move linearly downward toward the inner, bottom, lower most end (e.g., reference 25 in FIG. 5F) toward the bypass collection surface 26. This sequence or movement of the water from the nozzle assembly 40 along the main collection surface 22 from an outer or top end 24 to a bottom or inner end 25 will facilitate the rinsing of the main collection surface in an efficient manner causing the pet waste, including any urine, feces, etc., to be washed downward, and therefore, toward and into the basin 30 where it can be disposed of through the sewage, septic or other output line. In some embodiments, the nozzle assembly 40 will repeat the spray cycle illustrated in FIGS. 5D through 5F multiple times. In further embodiments, when the nozzle assembly 40 returns to the top end or uppermost end (FIG. 5D) from the bottom end or lowermost end (FIG. 5F), the water or nozzle assembly 40 may stop or deactivate such that water or other fluid is only sprayed from the nozzle assembly 40 when the nozzle assembly 40 is moving in a downward direction. Other embodiments may have a continuous spray through the nozzle assembly 40 during the rinsing and/or cleaning cycle, even when the nozzle assembly 40 is moving in an upward direction.

It should also be noted that in the embodiment wherein the nozzle assembly 40 moves in a direction other than a vertical or up and down direction, such as, for example, in the embodiment where the nozzle assembly 40 may move in a horizontal direction (e.g., FIG. 2C), the nozzles may be activated in a sequence starting from the top and progressively activating the nozzles along the nozzle assembly 40 such that the water is sprayed from the top end to the bottom end in a manner to wash the main collection surface from the top to the bottom toward the basin. For example, with reference to FIG. 2C, upper nozzles 42A and/or 42B may be activated first, thereby spraying a top or uppermost portion of the main collection surface 22 first. Then, a middle nozzle 42C may be activated, followed by activation of lower nozzles 42D and 42E. When the middle 42C and/or lower nozzles 42D, 42E are activated, in some embodiments, the upper nozzles 42A, 42B may be deactivated, while in other embodiments, the upper nozzles 42A, 42B may remain activated (and spraying) when the middle 42C and/or lower nozzles 42D, 42E are subsequently activated (and spraying).

In some cases, the nozzle assembly 40 may span or spray the main collection surface 22 and/or bypass collection surface 26 multiple times, in that the nozzle assembly 40 may move up and down, side-to-side, or otherwise within the interior portion of the apparatus 10 multiple times in a single wash, cleaning, or rinsing cycle. The water or other fluid will drain or fall from the main and bypass collection surfaces 22, 26 and into the basin 30. In some embodiments, the water or fluid collected in the basin 30 may be recirculated or recycled in that it can be pumped back into the nozzle assembly 40 and sprayed again at the main and bypass collection surfaces 22, 26. Other embodiments will drain the collected water, fluid and pet waste PW in the basin 30 through an outlet and into the building's sewage, septic or other waste disposal line.

Figure 5G:
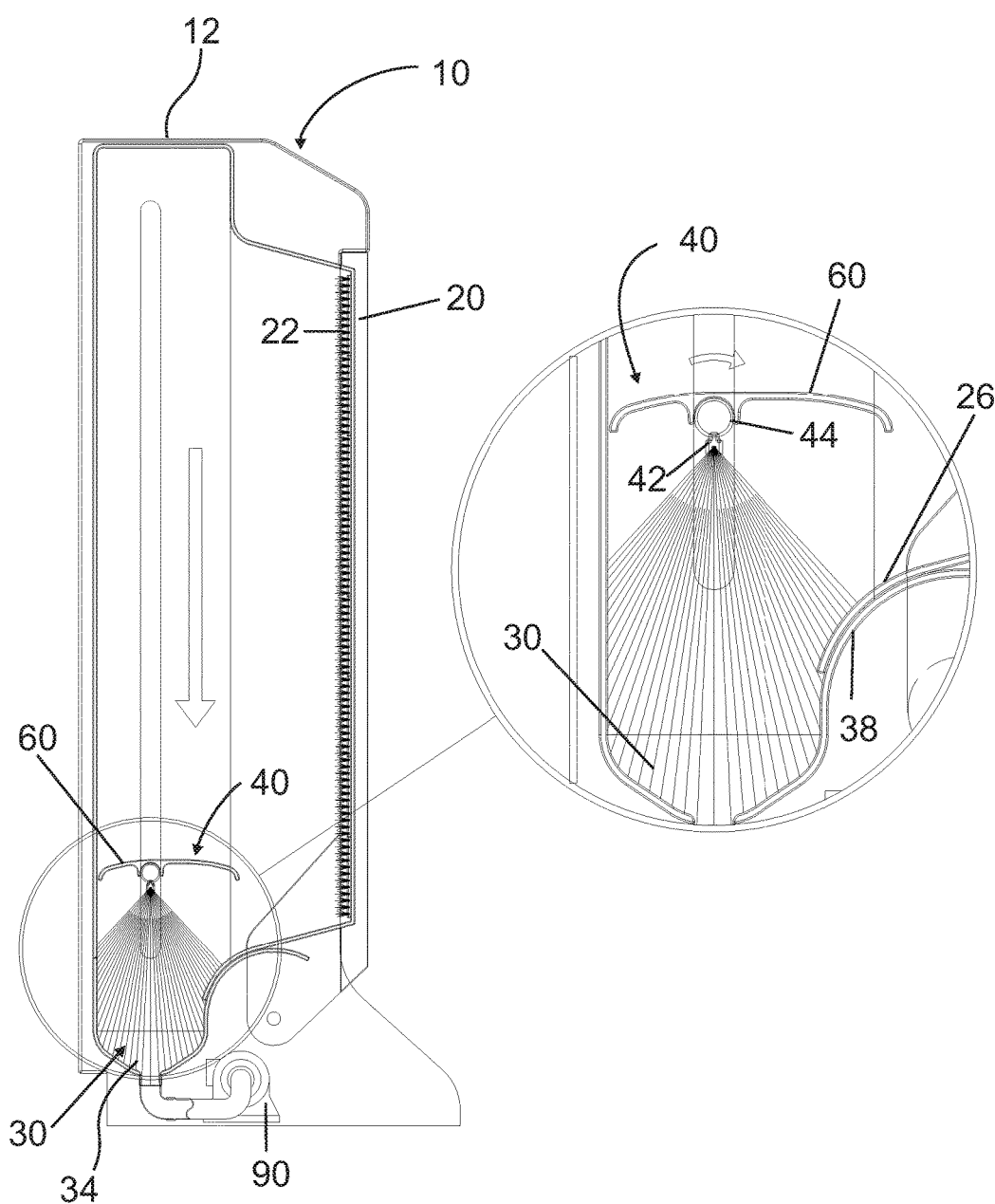
FIG. 5G is a side, at least partially transparent view of the pet waste collection and disposal apparatus as shown in FIGS. 5A through 5F with the nozzle assembly rotated downward and spraying the basin.

In FIG. 5G, the nozzle assembly 40 is rotated in a manner such that one or more of the nozzles 42 face or are directed in a substantially downward direction, toward the basin 30. This will allow rinsing of the basin 30, as well. For instance, after the basin is drained, fresh or other water or fluid may be pumped through the nozzle assembly 40 which can be used to rinse the basin 30.

Figure 5H:
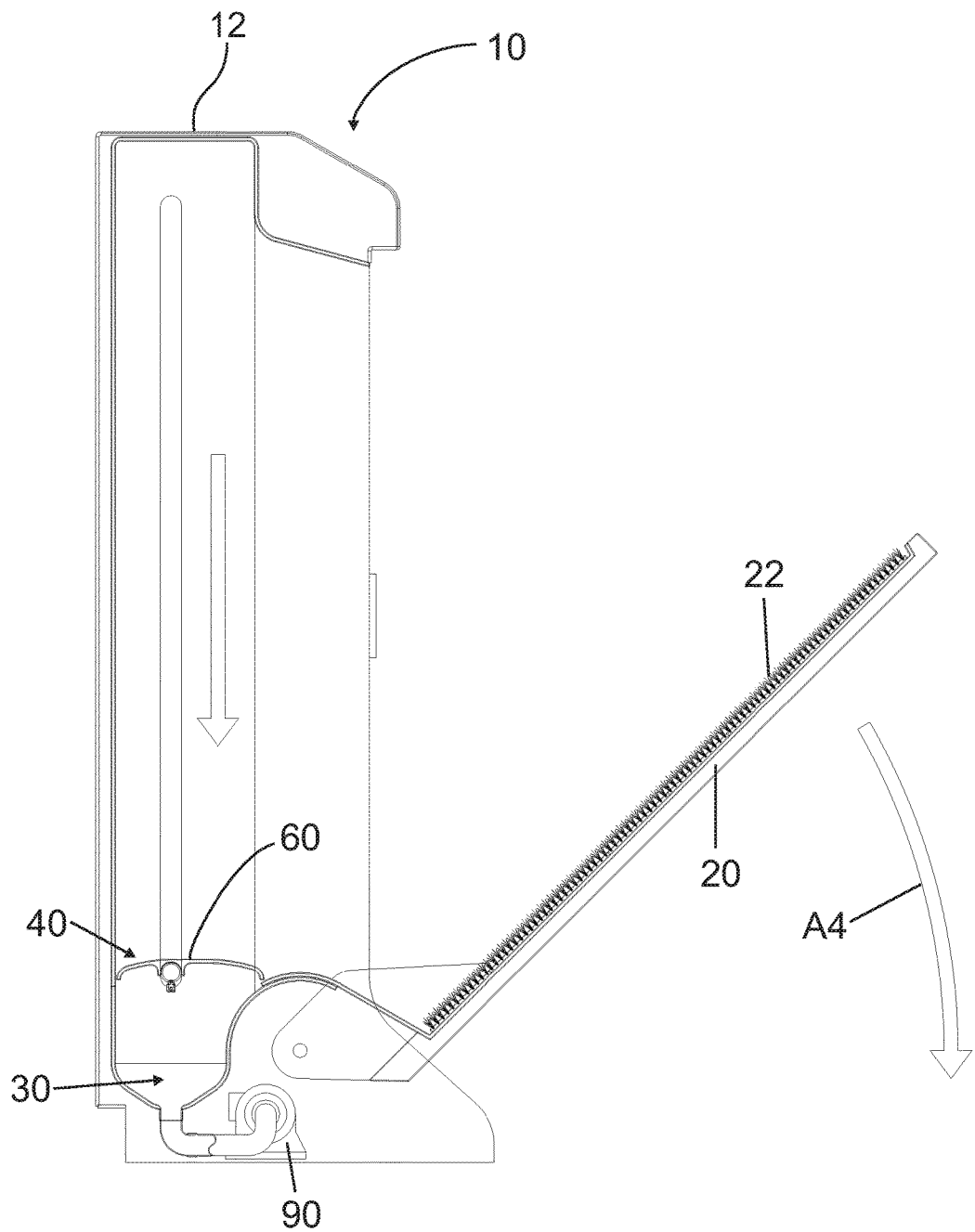
FIG. 5H is a side, at least partially transparent view of the pet waste collection and disposal apparatus as shown in FIGS. 5A through 5G, with the shield or cover in a covering relation to the basin and the door moving from the closed position to the open position.

Air circulation via one or more fans may be used to dry the main collection surface 22 and the interior portion of the housing 12. The nozzle assembly 40 can then be positioned in the lower, resting location with the shield or cover disposed in the covering relation to the basin 30, as shown in FIG. 5H. The door 20 may then be opened again, as shown by arrow A4, and the apparatus 10 may be used again.

It should also be noted that in some embodiments, the nozzle assembly 40 may include two separate nozzle tubes 44 and/or two sets of nozzles 42, one set directed toward the main collection surface 22 and another set directed toward the basin, for example. In this manner, the nozzle assembly 40 may not rotate within the housing 12, as described above, but will still be movable in a substantially vertical relation.

Figure 9:
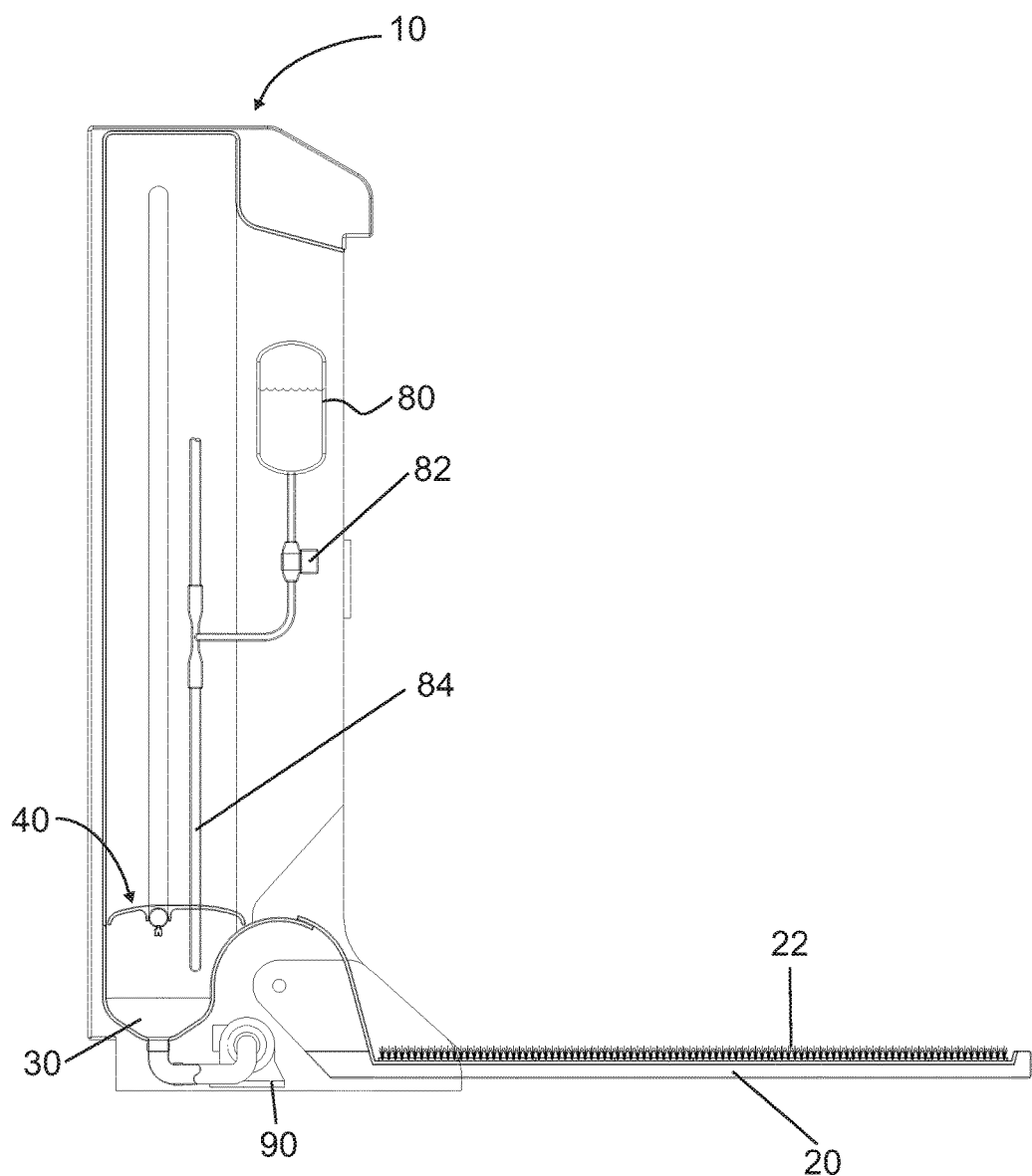
FIG. 9 is a side, at least partially transparent view of the pet waste collection and disposal apparatus of at least one embodiment showing additive retention and disbursement systems.

With reference now to FIG. 9, at least one embodiment of the present invention may include one or more soap or additive assemblies such that soap, sanitizers, scents, etc. can be added to the fluid or water, for example, during the cleaning cycle. For example, as shown in FIG. 9, a receptacle 80 is provided and attached to a tube or other like system and directed into the basin 30 or other location for infusing soap or other additive into the water flow. For instance, a valve 82 (e.g., a venturi or solenoid valve) may be used and disposed between the receptacle 80 and the additive output 84. This allows a metered or controlled amount of additive to be added to the water flow. If the additive is added into the basin 30, as shown, the recirculated water or fluid (e.g., water or fluid pumped from the basin 30 back through the nozzle assembly 40) will include the additive. It should be noted that the additive may include any fluid, solid, gel, powder, etc.

With reference now to the schematic drawings of FIGS. 10A through 10D, the flow of fluid through the apparatus 10 in at least one exemplary embodiment is shown. For instance, in FIG. 10A a pump 90 is shown in fluid communication with the basin 30, the nozzle assembly 40, a water source and a drain (e.g., sewage or septic drain). In some embodiments, a single pump 90 is provided for directing, pumping or otherwise causing water or fluid to flow through the system. As some embodiments will recycle some fluid from the basin 30 back through the nozzle assembly 40, the pump 90 of some embodiments may include a macerator pump, which is a pump that is capable of cutting, shredding, blending or grinding solid waste (e.g., fecal waste) before being pumped out or through the pump 90. As such, the pump 90 of some embodiments may include an internal grinding or blade mechanism (not shown) in order to accomplish the grinding of any solid or semi-solid matter being pumped there through.

Figure 10A:
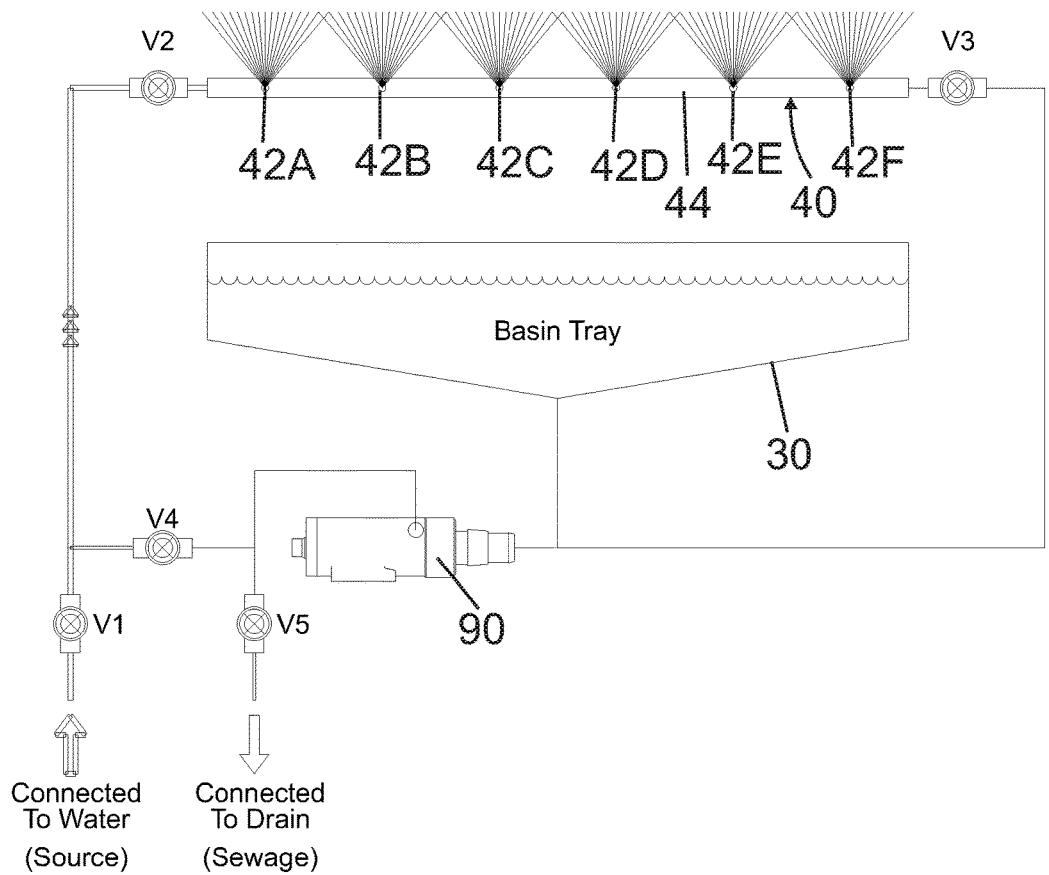
FIG. 10A is a schematic representation of the flow of water from the water source, through the nozzle assembly and into the basin, as disclosed in accordance with at least one embodiment herein.

In any event, FIG. 10A illustrates a schematic wherein the nozzle assembly 40 is washing or spraying with fresh water coming from the water source, such as, for example, an incoming water line provided via the plumbing of the building or structure. In this cycle, the nozzle assembly 40 may be cleaning the main collection surface 22, the bypass collection surface 26 or the basin 30 with fresh water. In this case, valves V1 and V2 are opened, whereas valves V3, V4 and V5 are closed. This will allow fresh water to flow through the nozzle assembly 40 and ultimately be collected within the basin 30. In some embodiments, a fill line sensor (not shown) in the basin will indicate when the basin 30 is full or near full such that no further water should be introduced into the system. In that case, the water introduction valve V1 can be closed and the water, fluid or other material in the basin 30 can either be drained (e.g., through the drain or sewage line) or recycled/re-circulated through the system, as provided herein.

Figure 10B:
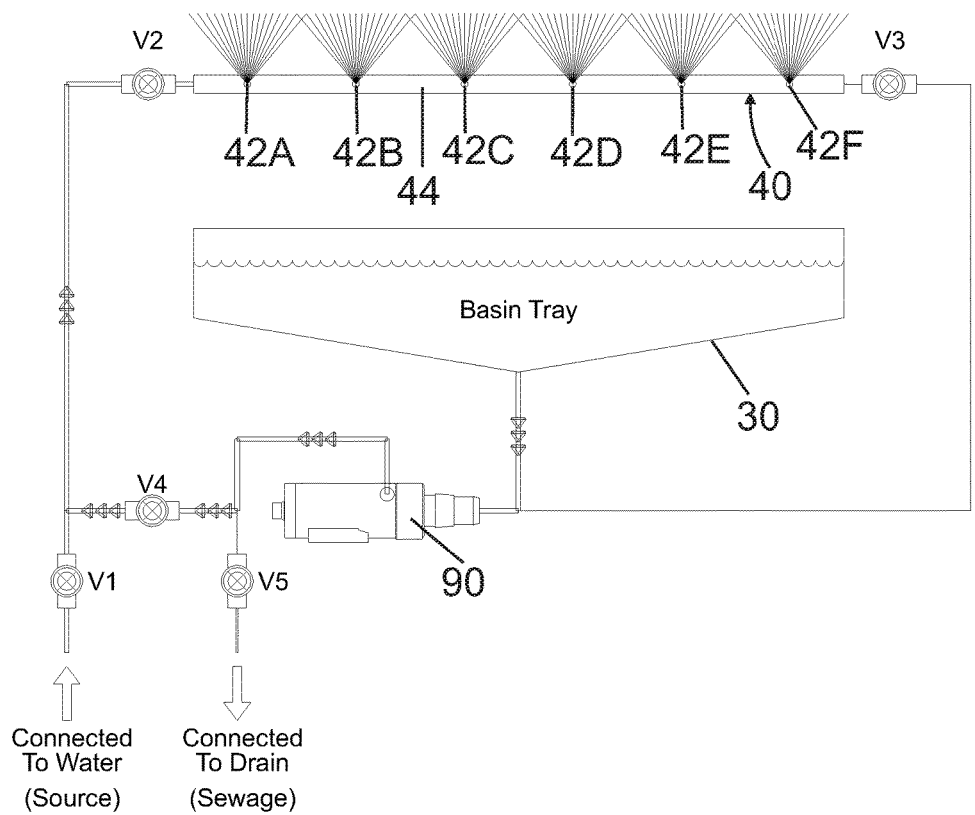
FIG. 10B is a schematic representation of the flow of recycled or re-circulated fluid from the basin, through the pump, through the nozzle assembly and back into the basin, as disclosed in accordance with at least one embodiment herein.

Particularly, FIG. 10B illustrates the system being used with recycled or re-circulated water or fluid. For example, the nozzle assembly 40 may be fed with the water or fluid collected in the basin 30 (for instance, the water, fluid, and in some cases, urine and fecal matter, collected in the basin 30 during the cycle illustrated in FIG. 10A). In this case, valves V4 and V2 are open, whereas valves V1, V3 and V5 are closed. Fluid will, thus, flow from the basin 30 through the pump 90 and into the nozzle assembly 40. As provided above, in some embodiments, the pump 90 may include a grinding mechanism (e.g., as provided in a macerator pump) in order to grind any solid or semi-solid materials in the basin. The water or fluid will again be collected in the basin 30 after it flows through the nozzle assembly 40.

Figure 10C:
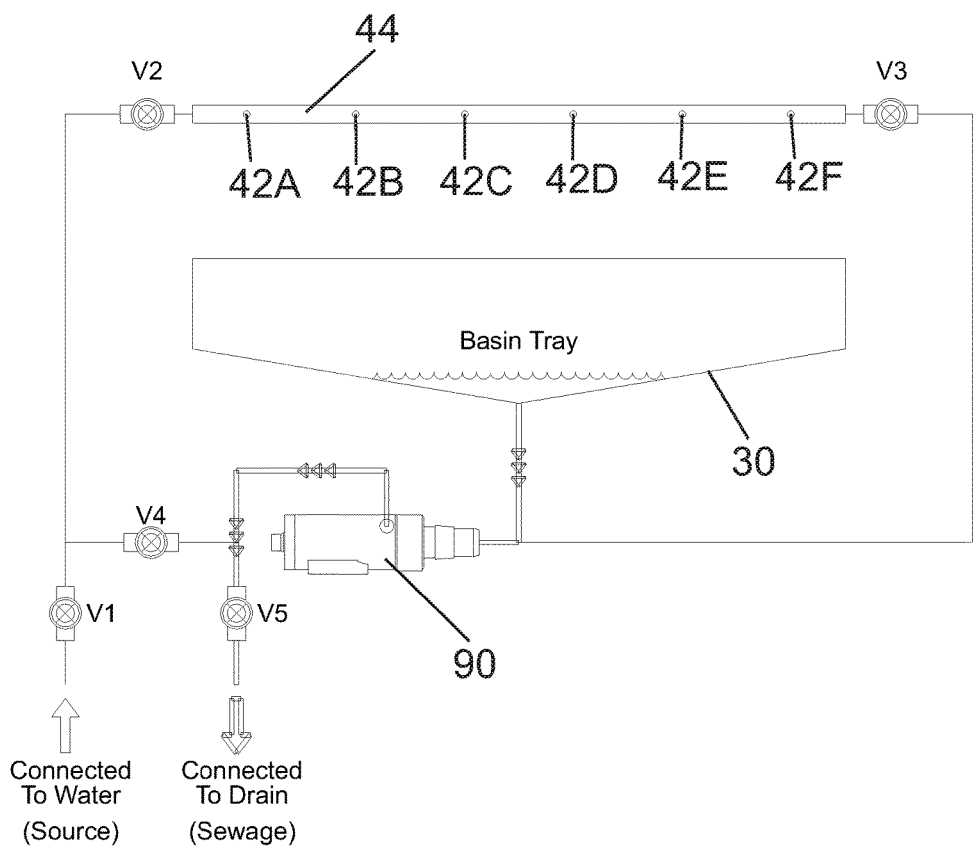
FIG. 10C is a schematic representation of the flow of fluid from the basin, through the pump and out through the connected drain, as disclosed in accordance with at least one embodiment herein.

FIG. 10C illustrates draining of the fluid from the basin 30 out to the sewage, septic or other drain line. For instance, in this example, valve V5 is open and valves V4 and V1 (and in some case, V2 and V3) are closed, such that the pump 90 will pump the fluid and other material from the basin 30 directly out to the sewage or other drain line.

It should be noted that, since at least one embodiment of the present invention may use recycled or re-circulated water or fluid (e.g., FIG. 10B), it is possible that some solid particles or other like matter may be inadvertently disposed or clogged within the spray tube 44 or one or more of the nozzles 42. Accordingly, in at least one embodiment, the nozzle assembly 40 may be flushed with clean or fresh water in an attempt to dislodge or clean any remaining particulates with the nozzle assembly 40.

Figure 10D:
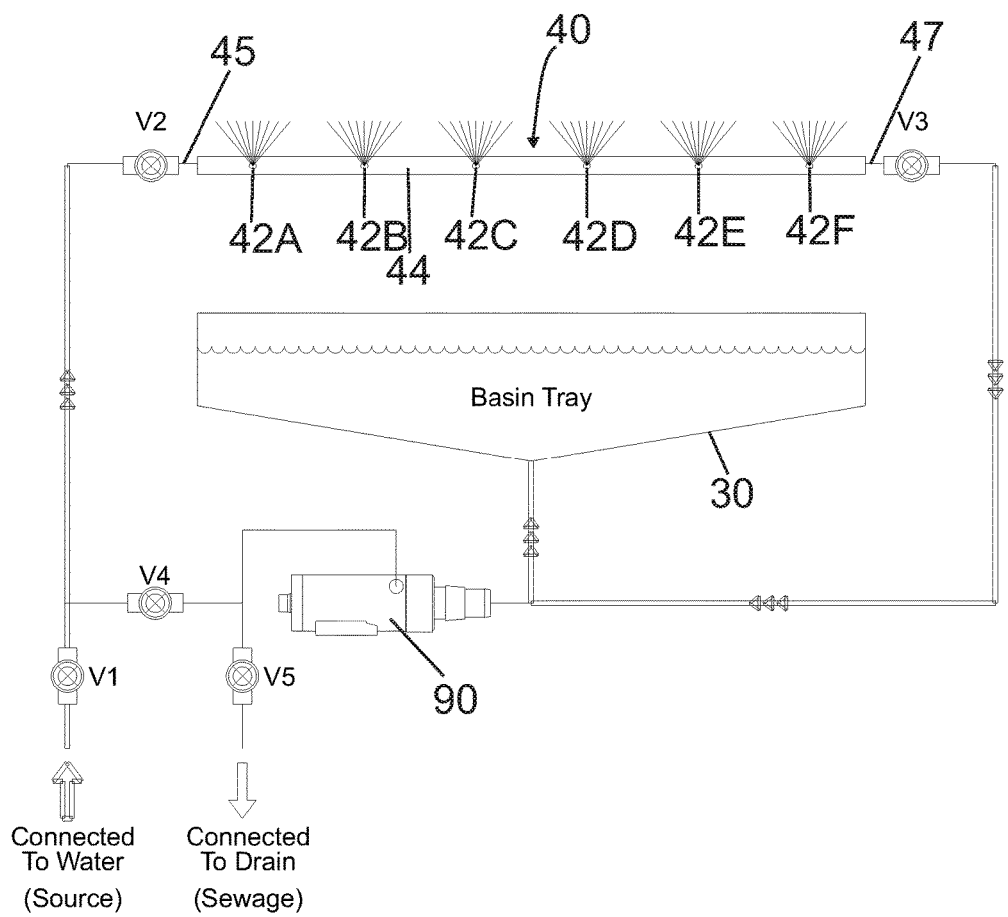
FIG. 10D is a schematic representation of the flow of fluid through the nozzle assembly for purposes of flushing the nozzle assembly, as disclosed in accordance with at least one embodiment herein.

For example, with reference to FIG. 10D, the spray tube 44 may include an open input end 45 and an open distal end 47 with a distal valve V3 disposed in fluid communication with the distal end 47 of the spray tube. When the nozzle assembly 40 is spraying fluid though the nozzles 42, for example, in order to rinse or clean the main collection surface 22, bypass collection surface 26 or basin 30, the distal valve V3 is closed (as provided in FIGS. 10A and 10B). However, in order to flush the nozzle assembly 40, the distal valve V3 is opened such that fluid can flow all the way through the spray tube 44, and either into the basin 30 or out of the sewage drain. Particularly, as shown in FIG. 10C, the valve V2 fluidically interconnected to the input end 45 of the spray tube is open, and the distal valve V3 fluidically interconnected to the distal end 47 of the spray tube is also open. Since, the spray tube 44 of at least one embodiment has open input and distal ends 45, 47, the fluid will flow through the tube 44. For instance, with valve V1 (water source valve) open, water will flow from the water source (e.g., water input line) and through the spray tube 44. In the illustrated embodiment, the water flows into the basin 30 (e.g., through the opening or output 36). Other embodiments may flow the water to the sewage output. In any event, any particulates that may have been lodged in the nozzle(s) 42 or spray tube 44, for example, during a re-circulation cycle (FIG. 10B), will likely be dislodges in the flushing cycle (FIG. 10D). The water or fluid can then be drained from the basin 30 and the apparatus 10 will be ready for use again.

Figure 11A:
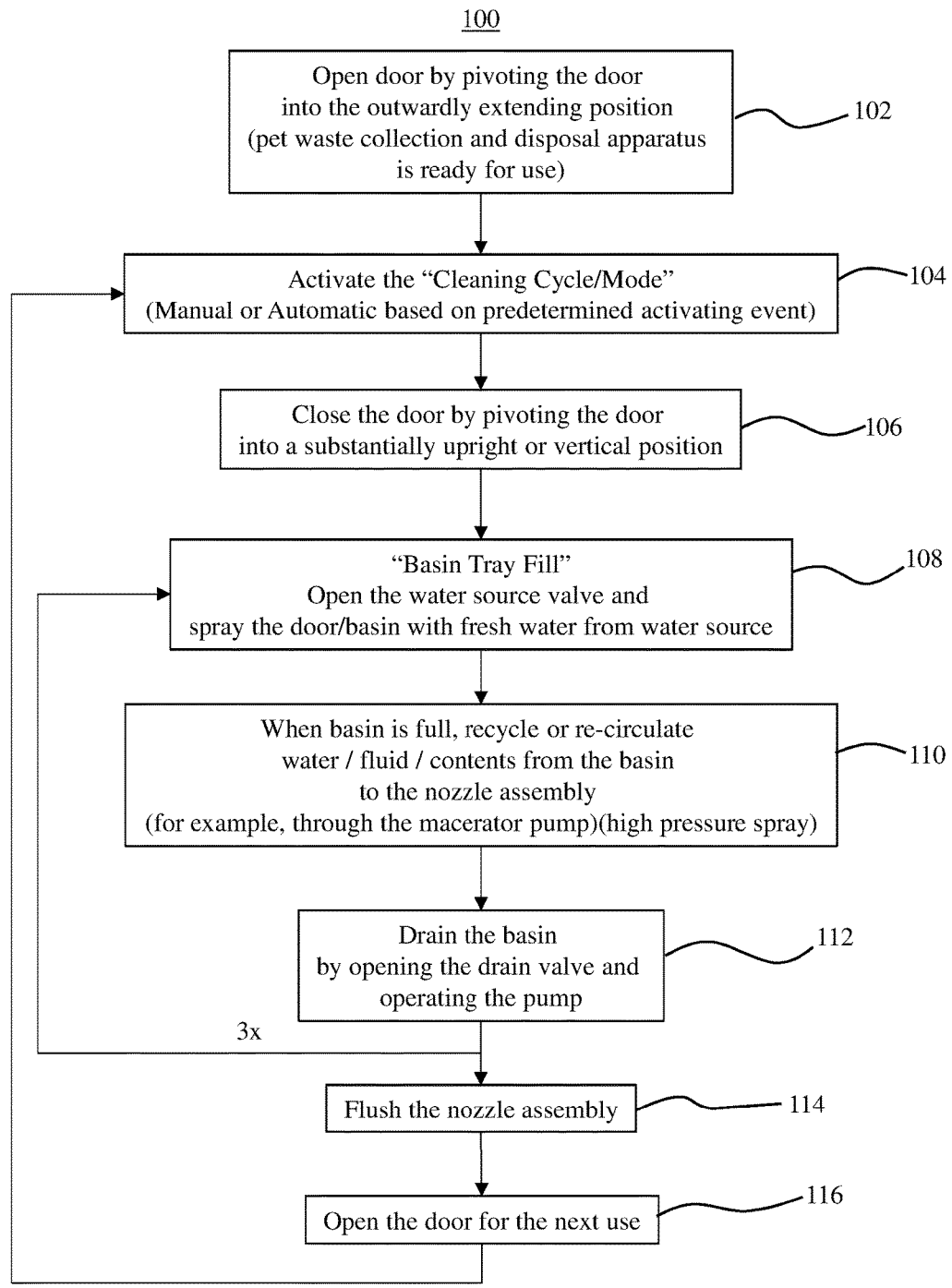
FIG. 11A is a high level flow chart illustrating the method as disclosed in accordance with at least one embodiment of the present invention.
Figure 11B:
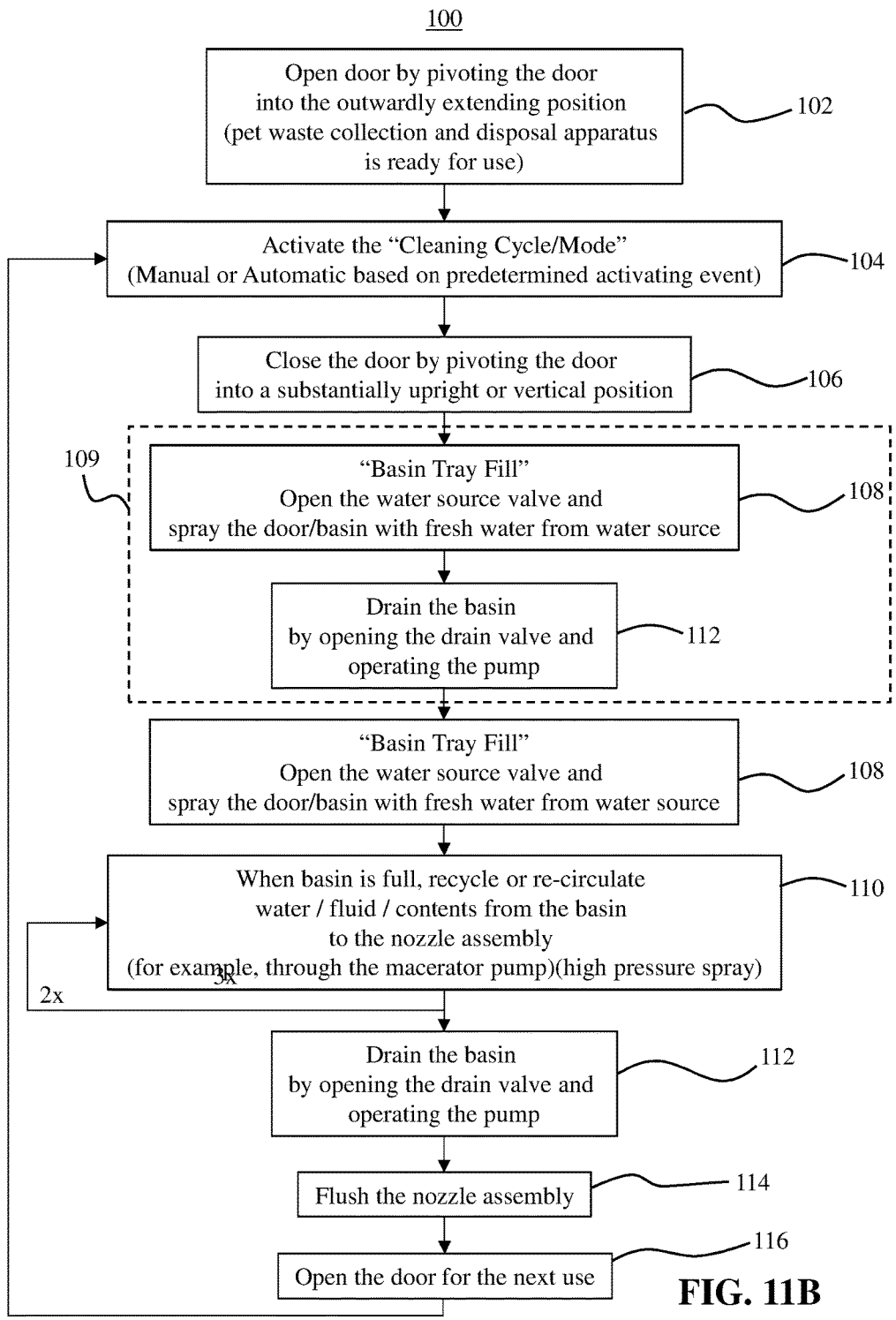
FIG. 11B is a high level flow chart illustrating the method as disclosed in accordance with another embodiment of the present invention.

As provided herein, and with reference to FIGS. 11A and 11B, the present invention further includes one or more methods 100 for operating a pet waste collection and disposal apparatus. For example, as shown at 102, the method 100 includes opening the door of the apparatus in order to receive pet waste upon a main collection surface of the door. As provided herein, the door may be vertically pivotal relative to the housing or body in order to dispose the door in the open and closed position. The open position being defined as being extending in a substantially outward relation relative to the body and defining a top, main collection surface upon which an animal or pet may leave pet waste (e.g., urine or feces).

The method 100 further includes activation of a cleaning mode or cleaning cycle, as shown at 104. In particular, the cleaning cycle may be activated manually, for example, by closing the door and/or by activating an appropriate activation button, touch screen, etc. Other embodiments include automatic operation or automatic activation of the cleaning cycle, for instance, upon the occurrence of a predetermined activating event. The predetermined activating event may be every active or confirmed use of the apparatus. For instance, one or more sensors (motion, moisture, gas, etc. sensors) may indicate when the apparatus has been used, or otherwise, every time a pet or animal has urinated or left feces upon the main collection surface of the door. Other embodiments may define the predetermined activating event as detection of flatus (or flatus gases), meaning that detection of urine or moisture will not activate the cleaning cycle. Other embodiments may define the predetermined activating event as either (a) detection of flatus (or flatus gases) or (b) after three confirmed detections of moisture or urine. Yet another embodiment may defined the predetermined activating event as a periodic event, such as every four hours, or every six hours. In such an embodiment, the cleaning cycle may be dismissed if there are no confirmed uses (either moisture, urine, or feces) since the last cleaning cycle.

In any event, the cleaning cycle, once activated, includes disposing the door in the closed position relative to the body 106. In some embodiments, as described herein, this means that that door will be pivoted upward, and the bypass collection surface will be disposed in an overlying relation with the leading lip of the basin. Gravity will thus allow some of the pet waste to fall from the now substantially vertical door, along the bypass collection surface, and into the basin.

With the door closed, the cleaning cycle continues by opening a water source valve (e.g., valve V1) for directing water from the water source into the nozzle assembly and toward the main collection surface of the door 108. The water source valve (V1) is a valve that controls the flow of water from the water source (e.g., the water input line from the building or structure) into the system (e.g., through the nozzle assembly). The nozzle assembly, in some embodiments, may move in a general up and down or side-to-side pattern to spray the entire main collection surface and in some cases, the bypass collection surface. The water or fluid from the nozzle assembly will flow down the main and/or bypass collection surfaces and into the basin where, in some embodiments, it is collected.

In at least one embodiment of the method 100, for instance, as shown in the flow chart of FIG. 11A, when the basin is full, for example, as detected by a water fill sensor (not shown), the water source valve (V1) is closed and water or fluid retained or collected in the basin may be recycled or re-circulated though the nozzle assembly 110. For instance, a pump (such as a macerator pump) may be used to direct the flow of fluid from the basin back through the nozzle assembly and toward the main collection surface of the door. The pump may include a grinding mechanism to grind up any solid or semi-solid materials or particles that may have been collected in the basin (e.g., feces). The recycled or recirculated water/fluid will also flow from the main and/or bypass collection surface(s) and into the basin where it can be collected or drained through the output or sewage line.

Spraying the main/bypass collection surfaces and/or basin with fresh and/or recirculated fluid (e.g., as shown at 108, 110 and 112) may, in some embodiments, be repeated, for example two (2), three (3) or more times.

With reference to the exemplary embodiment of FIG. 11B, for instance at 109, the method 100 may run fresh water through the nozzles 108, then drain the basin 112, before running fresh water again through the nozzles and re-circulating 110. This is because, the first run or rinse of the main collection surface 22 may result in a significant amount of solid material, semi-solid material or other pet waste that can be drained after the first rinse. Then, the fluid from subsequent rinses may be recirculated, for example two or three times to further clean or rinse the main collection surface, bypass collection surface, and in some cases, the basin, too.

The method 100 of certain embodiments may further include flushing the nozzle assembly, as shown at 114 in FIGS. 11A and 11B, for example, in order to dislodge any remaining particles that may be retained or stuck in the spray tube or nozzle(s). Specifically, as provided above, since some embodiments will re-circulate some or all of the fluid or water, it is possible that some solid particulates may be passed through the nozzle assembly, even in the event the pump includes a macerator pump or other like device with a grinding mechanism. For example, when spraying the main/bypass collection surfaces, some solid or semi-solid particles (e.g., feces) may end up in the basin. When re-circulating that fluid/water in the basin, the fluid/water, and the solid and semi-solid materials will pass through a pump and a grinding mechanism in an effort to grind all of the solids to a size that will not clog the nozzles or spray tube. However, it is possible that some particles may get through, and, thus the method of some embodiments will include flushing the nozzle assembly.

Accordingly, as provided above, fresh water may be directed from the water source through the spray tube, for instance, through the input end and out an open distal end (by opening a corresponding distal valve). The water will then flow back into the basin or out the sewage or output line.

As shown in FIGS. 11A and 11B, the method 100 of certain embodiments may further include opening the door 116, for example, by pivoting the door downward in a manner to extend it outward and ready for the next use.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A pet waste collection and disposal apparatus comprising:
    a body comprising an interior portion;
    a basin disposed within said interior portion of said body, said basin comprising an at least partially open top leading to an inner collection area for at least temporarily receiving pet waste;
    a door movably interconnected to said body in an at least partially vertically pivotal manner;
    said door comprising a main collection surface; and said door being pivotal between a substantially upward closed position and a substantially outward open position; and a nozzle assembly disposed within said interior portion of said body, said nozzle assembly comprising a plurality of spray nozzles for directing fluid toward said door when said door is disposed in said substantially upward closed position; and said nozzle assembly comprises a spray tube spanning at least partially within a portion of said interior portion of said body, and a plurality of spray nozzles disposed along a length of said spray tube; and said spray tube and said plurality of spray nozzles are linearly movable within said interior portion of said body via a nozzle positioning assembly; and said nozzle positioning assembly comprises at least two rails disposed on opposite sides of said spray tube, interconnected to said spray tube by corresponding brackets slidably engaged with said rails; and at least one motor for driving said slidably engaged brackets and said spray tube, along said rails; wherein the nozzle assembly is in a movable relation to the body.

2. The apparatus as recited in claim 1 wherein:

said spray tube comprises a longitudinal axis about the center of the spray tube; and said plurality of spray nozzles are at least partially rotatable about said axis for rotatably directing said spray nozzles between at least two positions wherein a first one of said at least two positions is defined as directing said plurality of spray nozzles at least partially outward and toward said main collection surface of said door when said door is disposed in said closed position; and a second one of said at least two positions is defined as directing said plurality of spray nozzles at least partially downward and toward said inner collection area of said basin; wherein the nozzle assembly is in a rotatable and movable relation to the housing.

3. The apparatus as recited in claim 1 wherein a basin cover is positioned in an at least partially covering relation relative to said inner collection area of said basin when said door is disposed in said substantially outward open position.

4. The apparatus as recited in claim 1 wherein:

said door being pivotal between a substantially upward closed position and a substantially outward open position; and pivoting about an offset pivot; wherein the main collection surface rests substantially flush with a ground surface when the door is pivoted to an outward open position.

* * * * *